(12) United States Patent
Wei et al.

(10) Patent No.: US 11,890,600 B2
(45) Date of Patent: Feb. 6, 2024

(54) LOW TEMPERATURE $NO_x$ ADSORBER WITH ENHANCED REGENERATION EFFICIENCY

(71) Applicant: BASF Corporation, Florham Park, NJ (US)

(72) Inventors: Xinyi Wei, Iselin, NJ (US); Evan Vincent Miu, Pittsburgh, PA (US); Xiaoming Xu, Iselin, NJ (US); Jia Cheng Liu, Shanghai (CN); Stefan Maurer, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/754,951

(22) PCT Filed: Oct. 19, 2020

(86) PCT No.: PCT/US2020/056259
§ 371 (c)(1),
(2) Date: Apr. 18, 2022

(87) PCT Pub. No.: WO2021/080894
PCT Pub. Date: Apr. 29, 2021

(65) Prior Publication Data
US 2022/0410133 A1    Dec. 29, 2022

(30) Foreign Application Priority Data
Oct. 21, 2019  (WO) ................ PCT/CN2019/112328

(51) Int. Cl.
*B01J 29/06*  (2006.01)
*B01J 29/74*  (2006.01)
(Continued)

(52) U.S. Cl.
CPC ............ *B01J 29/67* (2013.01); *B01D 53/944* (2013.01); *B01D 53/9422* (2013.01);
(Continued)

(58) Field of Classification Search
CPC ... B01J 29/67; B01J 21/08; B01J 23/42; B01J 29/7415; B01J 29/80; B01J 35/0006;
(Continued)

(56) References Cited

U.S. PATENT DOCUMENTS

2011/0099975 A1  5/2011  Bailey et al.
2015/0266002 A1  9/2015  Biberger et al.
(Continued)

FOREIGN PATENT DOCUMENTS

CN  113811674 A    12/2021
EP  0 485 180 A1 *  5/1992  ............. B01D 53/36
(Continued)

OTHER PUBLICATIONS

International Search Report dated Jan. 27, 2021, for International Application No. PCT/US2020/056259.
(Continued)

*Primary Examiner* — Timothy C Vanoy
(74) *Attorney, Agent, or Firm* — DLA Piper LLP (US)

(57) ABSTRACT

The present disclosure provides Low Temperature $NO_x$-Absorber (LT-NA) catalyst compositions, catalyst articles, and an emission treatment system for treating an exhaust gas, each including the LT-NA catalyst compositions. Further provided are methods for reducing a $NO_x$ level in an exhaust gas stream using the LT-NA catalyst articles. In particular, the LT-NA catalyst compositions include a first zeolite, a first palladium component, and a plurality of platinum nanoparticles. The LT-NA catalyst compositions exhibit enhanced regeneration efficiency with respect to $NO_x$ adsorption capacity, even after hydrothermal aging.

31 Claims, 14 Drawing Sheets

(51) Int. Cl.

| | |
|---|---|
| *B01J 29/80* | (2006.01) |
| *B01J 23/42* | (2006.01) |
| *B01J 21/08* | (2006.01) |
| *B01J 35/00* | (2006.01) |
| *B01J 35/04* | (2006.01) |
| *B01D 53/94* | (2006.01) |
| *F01N 3/28* | (2006.01) |
| *B01J 29/67* | (2006.01) |

(52) U.S. Cl.
CPC ..... *B01D 53/9468* (2013.01); *B01D 53/9472* (2013.01); *B01D 53/9477* (2013.01); *B01J 21/08* (2013.01); *B01J 23/42* (2013.01); *B01J 29/7415* (2013.01); *B01J 29/80* (2013.01); *B01J 35/0006* (2013.01); *B01J 35/0013* (2013.01); *B01J 35/04* (2013.01); *F01N 3/2803* (2013.01); *B01D 2255/1021* (2013.01); *B01D 2255/1023* (2013.01); *B01D 2255/50* (2013.01); *B01D 2255/9022* (2013.01); *B01D 2255/9032* (2013.01); *B01D 2255/9035* (2013.01); *B01D 2255/9155* (2013.01); *B01D 2255/9202* (2013.01); *B01J 2029/062* (2013.01); *F01N 2370/04* (2013.01)

(58) Field of Classification Search
CPC .. B01J 35/0013; B01J 35/04; B01J 2029/062; B01D 53/9422; B01D 53/944; B01D 53/9468; B01D 53/9472; B01D 2255/1021; B01D 2255/1023; B01D 2255/50; B01D 2255/9022; B01D 2255/9032; B01D 2255/9035; B01D 2255/9155; B01D 2255/9202; F01N 3/2803; F01N 2370/04
See application file for complete search history.

(56) References Cited

U.S. PATENT DOCUMENTS

| | | | |
|---|---|---|---|
| 2015/0273452 A1* | 10/2015 | Chiffey | B01J 37/0244 |
| | | | 502/66 |
| 2019/0015781 A1* | 1/2019 | Wei | B01J 37/0211 |
| 2020/0061595 A1* | 2/2020 | Khivantsev | B01J 20/186 |
| 2020/0246784 A1* | 8/2020 | Hengst | B01D 53/9418 |
| 2021/0162382 A1* | 6/2021 | Hengst | B01J 29/7446 |
| 2022/0080394 A1* | 3/2022 | Woerz | B01D 53/944 |
| 2022/0212162 A1 | 7/2022 | Wei et al. | |

FOREIGN PATENT DOCUMENTS

| | | | |
|---|---|---|---|
| EP | 0638710 B1 | 8/1997 | |
| JP | 2016-195992 A | 11/2016 | |
| WO | WO 2015/097454 A1 | 7/2016 | |
| WO | WO 2017 075 504 A1 * | 5/2017 | B01D 53/94 |

OTHER PUBLICATIONS

First Office Action dated Jul. 29, 2023, of counterpart Chinese Patent Application No. 202080073167.4, along with an English machine translation.
Extended European Search Report dated Sep. 21, 2023, of counterpart European Patent Application No. 20879935.3.
Communication Pursuant to Rules 70(2) and 70a(2) EPC dated Oct. 10, 2023, of counterpart European Patent Application No. 20879935.3.

* cited by examiner

Fig. 1A
Fig. 1B
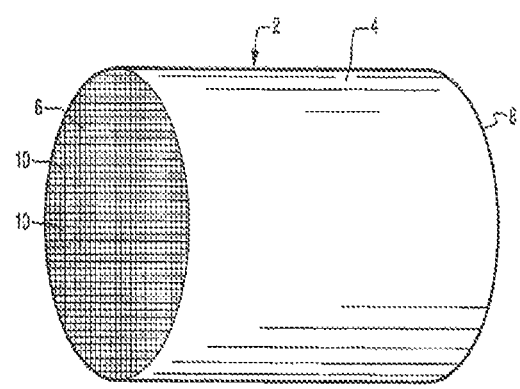
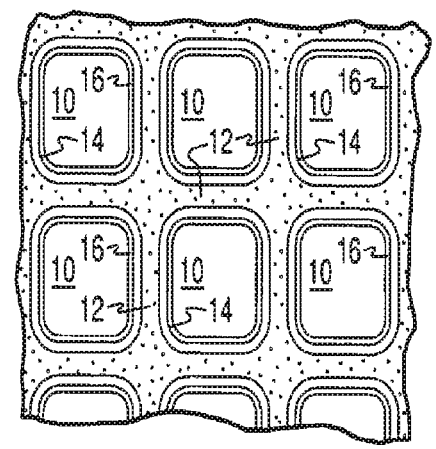

LOW TEMPERATURE NO$_x$ ADSORBER WITH ENHANCED REGENERATION EFFICIENCY

CROSS-REFERENCE TO RELATED APPLICATIONS

This application is a national stage filing under 35 U.S.C. § 371 of International Application No. PCT/US2020/056259, filed on Oct. 19, 2020, which claims the benefit of priority to International Application No. PCT/CN2019/112328, filed on Oct. 21, 2019; the disclosure of each of these applications are each incorporated herein by reference in its entirety.

FIELD OF THE DISCLOSURE

The present invention is directed to compositions, articles, systems, and methods suitable for treating exhaust gas streams of lean burn internal combustion engines to reduce emissions of nitrogen oxides (NO$_x$).

BACKGROUND

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides (NO$_x$), wherein NO$_x$ describes various chemical species of nitrogen oxides, including nitrogen monoxide and nitrogen dioxide, among others. NO$_x$ are harmful components of atmospheric pollution. Various methods have been used for the treatment of NO$_x$-containing gas mixtures to decrease atmospheric pollution.

An effective method to reduce NO$_x$ from the exhaust of lean-burn engines requires reaction of NO$_x$ under lean burn engine operating conditions with a suitable reductant in the presence of a selective catalytic reduction (SCR) catalyst component. The SCR process typically uses as the reductant ammonia or a hydrocarbon in the presence of atmospheric oxygen, resulting in the formation predominantly of nitrogen and steam:

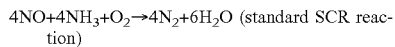
4NO+4NH$_3$+O$_2$→4N$_2$+6H$_2$O (standard SCR reaction)

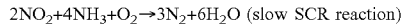
2NO$_2$+4NH$_3$+O$_2$→3N$_2$+6H$_2$O (slow SCR reaction)

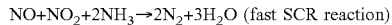
NO+NO$_2$+2NH$_3$→2N$_2$+3H$_2$O (fast SCR reaction)

Current catalysts employed in the SCR process include molecular sieves, such as zeolites, ion-exchanged with a catalytic metal such as iron or copper. A useful SCR catalyst component is able to effectively catalyze the reduction of the NO$_x$ exhaust component at temperatures below 600° C. so that reduced NO$_x$ levels can be achieved even under conditions of low load, which typically are associated with lower exhaust temperatures.

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides (NO$_x$) and/or carbon monoxide (CO) emissions. In general, catalytic components such as SCR catalyst components are very effective in converting NO$_x$ to N$_2$ at temperatures above 200° C. but do not exhibit sufficient activities at lower temperature regions (<200° C.) such as those found during cold-start or prolonged low-speed city driving. Employing a catalyst that is functional during low temperature operation (<150° C.) can help to meet these increasingly tighter emissions regulations (e.g., Euro-7 regulations). As >80% of cold-start NO$_x$ emission consists of NO, it is imperative that such advanced NO$_x$ adsorption materials have great efficiency for NO adsorption. Therefore, components capable of capturing and storing such low-temperature NO$_x$ emissions, and being able to release it at higher temperatures (>200° C.) when downstream catalytic components (e.g., SCR catalyst components) become effective are in great demand. As a result, considerable efforts have been made to alleviate this problem.

There are several ways to minimize NO$_x$ emissions during cold-start periods. For instance, trapping systems have been developed which can store these exhaust gas emissions (i.e., HC, CO and NO$_x$ gases) at low temperatures and subsequently release them at higher temperatures, when the remaining catalytic components of the treatment system have attained sufficient catalytic activity. One such system is the Lean NO$_x$ Trap (LNT) catalyst, a well-known and commercially proven technology. LNT catalysts contain NO$_x$ adsorbent components that trap NO$_x$ under certain exhaust conditions. For example, the NO$_x$ adsorbent components can comprise alkaline earth elements, e.g., including alkaline earth metal oxides and carbonates, such as oxides of Mg, Ca, Sr, and/or Ba. Other LNT catalysts can contain rare earth metal oxides as NO$_x$ adsorbent components, such as oxides of Ce, La, Pr, and/or Nd. LNT catalysts further contain a platinum group metal component (PGM) such as platinum dispersed on a refractory metal oxide (e.g., alumina) support for catalytic NO$_x$ oxidation and reduction. The LNT catalyst operates under cyclic lean (trapping mode) and rich (regeneration mode) exhaust conditions. Under lean conditions, the LNT catalyst traps and stores NO$_x$ as an inorganic nitrate (for example, where the NO$_x$ adsorbent component is BaO or BaCO$_3$, it is converted to Ba(NO$_3$)$_2$) upon reaction with ("trapping") of NO$_x$. The NO$_x$ adsorbent component then releases the trapped NO$_x$ and the PGM component reduces the NO$_x$ to N$_2$ under stoichiometric or transient rich engine operating conditions, or under lean engine operation with external fuel injected in the exhaust to induce rich conditions. NO to NO$_2$ conversion is a prerequisite to efficient NO$_x$ trapping; however the reaction rate is very slow when temperature is below 200° C., which renders the traditional LNT catalyst inefficient for trapping of cold-start NO$_x$ emission. Further, a rich purge is required to regenerate the LNT catalyst, which reduces fuel economy, however minimally. Therefore, a preferred solution would be to have a NO$_x$ absorption/release component that operates under lean conditions only.

Another type of NO$_x$ adsorber is the Low-Temperature NO$_x$ Adsorber (LT-NA), which predominantly uses ion-exchanged Pd in zeolites as the NO$_x$ adsorbent. Pd/zeolite based materials have been shown to adsorb nitric oxide (NO) at ambient to low temperature, and can be applied for low temperature NO$_x$ control during cold-start period of automotive vehicles. However, one major concern regarding this technology is whether adsorbed NO$_x$ can be released sufficiently under typical diesel engine temperature cycles to adequately regenerate NO$_x$ adsorption capacity of the LT- NA. Failure to adequately regenerate such adsorption capacity would result in decreased $NO_x$ adsorption during subsequent cold-start periods. Accordingly, LT-NAs having good hydrothermal stability, high $NO_x$ adsorption capacity, and $NO_x$ desorption profiles optimized to meet requirements of specific engine applications are highly desirable.

SUMMARY OF THE INVENTION

The present disclosure generally provides compositions, articles, and exhaust treatment systems comprising such articles which exhibit enhanced regeneration efficiency for $NO_x$ adsorption. In particular, such compositions, articles and systems comprise a Low-Temperature $NO_x$ Adsorber (LT-NA) catalyst composition suitable for adsorbing $NO_x$ at low temperatures and releasing trapped $NO_x$ at elevated temperatures (>200° C.) when downstream catalytic components (i.e. SCR catalysts) become effective. The LT-NA catalyst compositions of the present disclosure provide desirable $NO_x$ adsorption and desorption properties under various engine operating conditions.

Surprisingly, according to the present disclosure, it has been found that doping palladium ion-exchanged zeolites with platinum nanoparticles leads to LT-NA compositions with enhanced regeneration of $NO_x$ adsorption capacity, even after hydrothermal aging, and which exhibit $NO_x$ desorption at a lower temperature range compared to LT-NA catalyst compositions which do not contain such platinum nanoparticles. When combined with a diesel oxidation catalyst (DOC) composition, such LT-NA catalyst compositions maintained the desirable $NO_x$ desorption profile both before and after hydrothermal aging.

Accordingly, in one aspect is provided a Low Temperature $NO_x$ Adsorber (LT-NA) catalyst composition comprising a first zeolite, a first palladium component, and a plurality of platinum nanoparticles, wherein at least a portion of the first palladium component is ion-exchanged in the first zeolite.

In some embodiments, the first palladium component is present in an amount of about 0.01% to about 10% by weight, based on the weight of the zeolite, and calculated as elemental palladium.

In some embodiments, at least a portion of the platinum nanoparticles are dispersed on the first zeolite.

In some embodiments, the platinum nanoparticles have an average particle size of from about 1 to about 50 nm. In some embodiments, the platinum nanoparticles have an average particle size of from about 1 to about 20 nm. In some embodiments, the platinum nanoparticles have an average particle size of from about 1 to about 10 nm. In some embodiments, the platinum nanoparticles have an average particle size of from about 1 to about 3 nm.

In some embodiments, the LT-NA composition further comprises a first refractory metal oxide component, wherein at least a portion of the platinum nanoparticles are dispersed on the first refractory metal oxide component. In some embodiments, a portion of the platinum nanoparticles is dispersed on the first zeolite, and a portion of the platinum nanoparticles is dispersed on the first refractory metal oxide component.

In some embodiments, the first refractory metal oxide component comprises gamma alumina or alumina doped with about 2% to about 10% $SiO_2$.

In some embodiments, the ratio of the first zeolite to the first refractory metal oxide component by weight is from about 10 to about 0.1.

In some embodiments, the platinum nanoparticles are present in an amount of from about 0.1 to about 10% by weight, based on the weight of the first zeolite, and calculated as elemental platinum.

In some embodiments, the first zeolite is an aluminosilicate zeolite having a silica-to-alumina ratio (SAR) of from about 5 to about 100. In some embodiments, the aluminosilicate zeolite has a SAR of from about 10 to about 40.

In some embodiments, the first zeolite has a framework type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof.

In some embodiments, the first zeolite is a medium pore zeolite with a framework type selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. In some embodiments, the first zeolite is a medium pore zeolite with a framework type selected from the group consisting of FER, MEL, MFI, STT, and mixtures or intergrowths thereof. In some embodiments, the first zeolite is FER.

In some embodiments, the LT-NA composition further comprises a second zeolite. In some embodiments, the second zeolite is a large pore zeolite having a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFW, SOF, SOS, STO, SSF, SSY, USI, UWY, VET and mixtures or intergrowths thereof. In some embodiments, the second zeolite is Beta zeolite (BEA).

In some embodiments, a portion of the first palladium component is ion-exchanged in the second zeolite. In some embodiments, a portion of the platinum nanoparticles are dispersed on the second zeolite.

In some embodiments, the LT-NA catalyst composition adsorbs $NO_x$ components from an exhaust gas stream at a temperature of from about 20° C. to about 200° C., and in an amount of from at least 30 to about 100% of the theoretical amount, based on a 1:1 mole ratio of $NO_x$/Pd, and based on the total amount of $NO_x$ present in the exhaust gas stream.

In some embodiments, the LT-NA catalyst composition releases $NO_x$ components back into an exhaust gas stream at a temperature of from about 150° C. to about 300° C., and in an amount of from at least 35 to about 100% by weight, based on the total amount of $NO_x$ components adsorbed onto the LT-NA catalyst composition.

In some embodiments, the LT-NA catalyst composition, after hydrothermal aging at 750-800° C. for a period of from about 16 to about 80 hours, has a $NO_x$ adsorption capacity that is from about 0.8 to about two times the $NO_x$ adsorption capacity prior to hydrothermal aging.

In another aspect is provided a LT-NA catalyst article for treating an exhaust stream of an internal combustion engine, the article comprising a substrate having an inlet end and an outlet end defining an overall length, and a first washcoat comprising the LT-NA catalyst composition as disclosed herein disposed on at least a portion thereof.

In some embodiments, the substrate comprises a honeycomb substrate in the form of a wall-flow filter or a flow-through substrate.

In some embodiments, the LT-NA catalyst article further comprises a second washcoat comprising a diesel oxidation catalyst (DOC) composition disposed on at least a portion of the substrate. In some embodiments, the DOC composition comprises a second Pd component and a second refractory metal oxide component, wherein the second Pd component is supported on the second refractory metal oxide component. In some embodiments, the second refractory metal oxide comprises gamma alumina or alumina doped with about 2% to about 10% $SiO_2$. In some embodiments, the DOC composition further comprises a third zeolite. In some embodiments, the third zeolite comprises Beta zeolite. In some embodiments, the third zeolite comprises Beta zeolite which is substantially free of any platinum-group metal (PGM) species.

In some embodiments, the first and second washcoats are present in a layered configuration, wherein the first washcoat is disposed directly on the substrate, and the second washcoat is disposed on at least a portion of the first washcoat. In some embodiments, the first and second washcoats are present in a layered configuration, wherein the second washcoat is disposed directly on the substrate and the first washcoat is disposed on at least a portion of the second washcoat. In some embodiments, the first washcoat and the second washcoat are combined and disposed on the substrate in a single homogenous layer. In some embodiments, the first and second washcoats are present in a zoned configuration, wherein the first washcoat is disposed on the catalyst substrate from the inlet end to a length from about 10% to about 70% of the overall length; and wherein the second washcoat is disposed on the catalyst substrate from the outlet end to a length from about 30 to about 90% of the overall length.

In another aspect is provided an exhaust gas treatment system comprising a LT-NA catalytic article as disclosed herein, wherein the LT-NA catalytic article is downstream of and in fluid communication with an internal combustion engine. In some embodiments, the exhaust gas treatment system further comprises one or more of a lean $NO_x$ trap (LNT), a selective catalytic reduction (SCR) catalyst, an ammonia or ammonia precursor injection component, a catalyzed soot filter (CSF), or an ammonia oxidation (AMOx) catalyst.

In another aspect is provided a method for reducing a $NO_x$ level in an exhaust gas stream from an internal combustion engine, the method comprising contacting the exhaust gas stream with the LT-NA catalyst article, or with the exhaust gas treatment system, each as disclosed herein.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1A is a perspective view of a honeycomb-type substrate which may comprise a catalyst (i.e., low-temperature $NO_x$ adsorber) washcoat composition in accordance with the present disclosure;

FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1, in an embodiment wherein the substrate is a flow-through substrate;

DETAILED DESCRIPTION OF THE INVENTION

Figure 2:
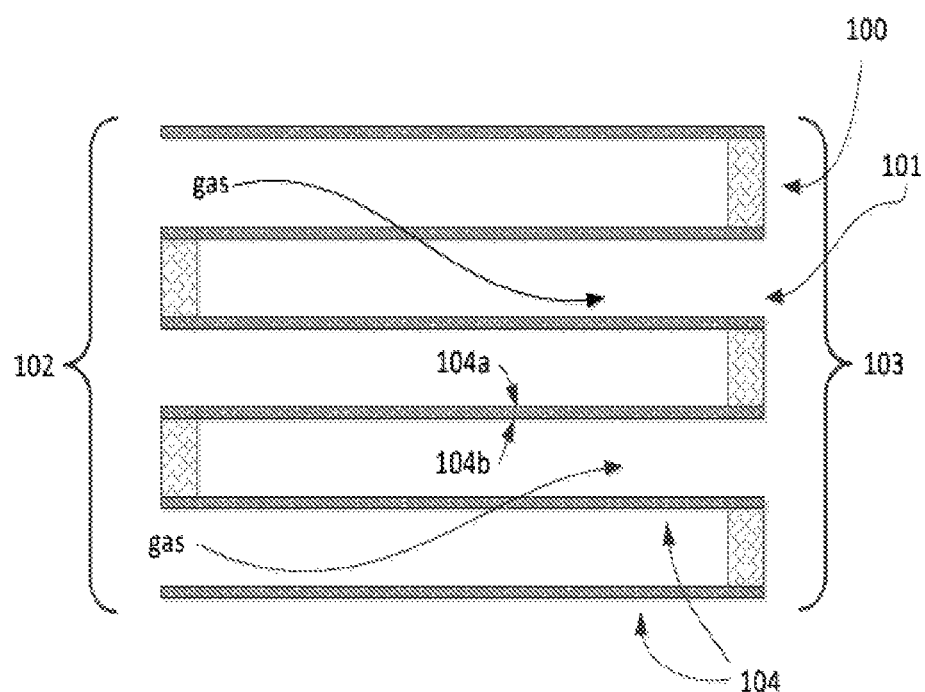
FIG. 2 is a cutaway view of a section enlarged relative to FIG. 1A, wherein the honeycomb-type substrate in FIG. 1A represents a wall-flow filter.

The present disclosure generally provides compositions, articles and exhaust gas treatment systems comprising such articles suitable for the adsorption and subsequent thermal release of $NO_x$. In particular, such articles and systems comprise a $NO_x$ adsorber composition suitable for adsorbing $NO_x$ at low temperatures (a LT-NA) and thermally releasing trapped $NO_x$ at elevated temperatures. This is of particular importance, for example, when the LT-NA article is placed upstream of a selective catalytic reduction (SCR) catalyst component that is very effective in converting $NO_x$ to $N_2$ at temperatures above 200° C., but does not exhibit sufficient activity at lower temperature regions (<200° C.), such as during cold-start and before urea can be injected into the exhaust. Adequate regeneration of $NO_x$ adsorption capacity through desorption at elevated temperatures is important to maintain adequate $NO_x$ adsorption capacity for subsequent cold-start cycles.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The term "abatement" means a decrease in the amount, caused by any means.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with $D_{50}$, meaning half of the population of particles has a particle size above this point, and half below. Particle size refers to primary particles. Particle size may be measured by laser light scattering techniques, with dispersions or dry powders, for example according to ASTM method D4464. $D_{90}$ particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for the support-containing particles (micron size).

The term "catalyst" refers to a material that promotes a chemical reaction. The catalyst includes the "catalytically active species" and the "support" that carries or supports the active species. For example, zeolites may be supports for e.g., platinum group metal (PGM) or base metal active catalytic species. Likewise, refractory metal oxide particles may be a support for platinum group metal catalytic species. The catalytically active species are also termed "promoters" as they promote chemical reactions. For instance, a present PGM-containing zeolite may be termed a PGM-promoted zeolite. A "promoted zeolite" refers to a zeolite to which catalytically active species are intentionally added.

The term "catalytic article" or "catalyst article" in the disclosure means an article comprising a substrate having a catalyst coating composition.

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also coated directly onto a wall-flow filter, which is called SCRoF.

As used herein, the phrase "catalyst system" refers to a combination of two or more catalysts or articles, for example, a combination of a low-temperature $NO_x$ adsorber (LT-NA) and a second catalyst which may be a DOC, a LNT or a SCR catalyst article. The catalyst system may alternatively be in the form of a washcoat in which the two catalysts are mixed together or coated in separate layers The term "configured" as used in the description and claims is intended to be an open-ended term as are the terms "comprising" or "containing." The term "configured" is not meant to exclude other possible articles or elements. The term "configured" may be equivalent to "adapted."

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

As used herein, "impregnated" or "impregnation" refers to permeation of the catalytic material into the porous structure of the support material.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

"LNT" refers to a lean $NO_x$ trap, which is a catalyst containing a platinum group metal, a rare earth metal oxide, and an alkaline earth metal trap material suitable to adsorb $NO_x$ during lean conditions (for example, BaO or MgO). Under rich conditions, $NO_x$ is released and reduced to nitrogen.

As used herein, the term "molecular sieves," such as zeolites and other zeolitic framework materials (e.g. isomorphously substituted materials), refers to materials that may, in particulate form, support catalytic PGMs or other catalytic metals. Molecular sieves are materials based on an extensive three-dimensional network of oxygen ions containing generally tetrahedral type sites and having a substantially uniform pore distribution, with the average pore size being no larger than 20 Angstroms (Å). Molecular sieves can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 to 10 Å in diameter. CHA is an example of an "8-ring" molecular sieve having 8-ring pore openings and double-six ring secondary building units and having a cage like structure resulting from the connection of double six-ring building units by 4 ring connections. Molecular sieves comprise small pore, medium pore and large pore molecular sieves or combinations thereof. The pore sizes are defined by the largest ring size.

As used herein, the terms "nitrogen oxides" or "$NO_x$" designate the oxides of nitrogen, such as NO, $NO_2$ or $N_2O$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt % based on the weight of the washcoat. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt %)," if not otherwise indicated, is based on an entire composition free of any volatiles, that is, based on dry solids content. Unless otherwise indicated, all parts and percentages are by weight.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO, and MeAlPO materials are considered non-zeolitic molecular sieves.

A present zeolite, independently, may comprise $SiO_4$/$AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms.

Typically, any framework type of zeolite can be used, such as framework types of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof.

Zeolites are crystalline materials having rather uniform pore sizes which, depending upon the type of zeolite and the type and amount of cations included in the zeolite lattice, range from about 3 to 10 Å in diameter. The pore sizes are defined by the ring size. As used herein, the term "small pore" refers to pore openings which are smaller than about 5 Å, for example on the order of ~3.8 Å.

A small pore zeolite contains channels defined by up to eight tetrahedral atoms. The phrase "8-ring" zeolite refers to a zeolite having 8-ring pore openings and double-six ring secondary building units and having a cage like structure resulting from the connection of double six-ring building units by 4 rings.

Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFW, SOF, SOS, STO, SSF, SSY, USI, UWY, VET and mixtures or intergrowths thereof.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, Pre-Grant publications and patents referred to herein are hereby incorporated by reference in their entireties.

Low Temperature $NO_x$ Adsorber (LT-NA) Catalyst Compositions

The present disclosure provides an LT-NA catalyst composition comprising a first zeolite comprising a first palladium component and a plurality of platinum nanoparticles. These components are further described herein below.

First Zeolite

As referenced above, the present LT-NA catalyst composition comprises a first zeolite. As used herein reference to a "first zeolite" is made to distinguish between additional zeolites (e.g., a second and third zeolite) which may also be present in some embodiments. The first, and when present, a second and third zeolite as described below, may be referred to as primary, secondary, and tertiary zeolites, respectively. In some embodiments, the first zeolite is an aluminosilicate zeolite.

The molar ratio of silica-to-alumina ("SAR") of a present first zeolite can vary over a wide range, but is generally 2 or greater. For instance, a present first zeolite may have a SAR of from about 1 to about 1000. In one or more embodiments, the first zeolite has a SAR molar ratio in the range of about 1, about 2, about 5, about 8, about 10, about 15, about 20, or about 25, to about 30, about 35, about 40, about 45, about 50, about 60, about 70, about 80 about 90, about 100, about 150, about 200, about 260, about 300, about 400, about 500, about 750 or about 1000.

In some embodiments, the first zeolite has a SAR of from about 2 to about 300, including about 5 to about 250; about 5 to about 200; about 5 to about 100; and about 5 to about 50.

In one or more specific embodiments, the first zeolite has a SAR molar ratio in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50.

In some embodiments, the first zeolite has a SAR of from about 5 to about 100. In some embodiments, the first zeolite has a SAR of from about 10 to about 40. In some embodiments, the SAR is from about 2 to about 50. In some embodiments, the SAR is about 25.

According to one or more embodiments, the first zeolite can be based on the framework topology by which the structures are identified. For example, a present first zeolite may have a framework type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof.

In some embodiments, the first zeolite has a two-dimensional pore system. In some embodiments, the zeolite having the two-dimensional pore system may have a framework type such as, but not limited to, FER, CSV, DAC, HEU, MFS, MWW, NES, RRO, SFG, STI, STT, or TER. Synthesis of zeolites with the FER structure and discussion of pore geometry is disclosed in, for example, Weitkamp et al., *Chem. Eng. Technol.* 25, (2002), 3, 273-275; Pinar et al., *Proceedings of the 5th Serbian-Croatian-Slovenian Symposium on Zeolites,* 32-35; and Parikh et al., *Indian Journal of Chemical Technology*, 18, Sep. 2011, 335-342, each of which is incorporated herein by reference in their entirety.

In some embodiments, the first zeolite may be a medium pore zeolite with a framework type selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof. In some embodiments, the first zeolite is a medium pore zeolite with a framework type selected from the group consisting of FER, MEL, MFI, STT, and mixtures or intergrowths thereof. In some embodiments, the first zeolite has the framework FER. In some embodiments, the first zeolite is ferrierite.

In some embodiments, the first zeolite has a mean crystal size (i.e., of individual crystals including twinned crystals) of greater than about 0.1 μm. In some embodiments, the first zeolite has a mean crystal size between about 0.1 μm and about 15 μm, for example, from about 0.5 μm to about 5 μm, about 0.7 μm to about 1.5 μm, about 1 μm to about 5 μm, or about 1 μm to about 10 μm.

Second Zeolite

In some embodiments, the LT-NA composition further comprises a second zeolite. In some embodiments, the second zeolite is a large pore zeolite having a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFW, SOF, SOS, STO, SSF, SSY, USI, UWY, VET and mixtures or intergrowths thereof. In some embodiments, the second zeolite is Beta zeolite (BEA).

First Palladium Component

As referenced above, the disclosed LT-NA catalyst composition comprises a first zeolite and a first palladium component, wherein at least a portion of the first palladium component is ion-exchanged in the first zeolite. The term "palladium component" as used herein refers to palladium metal, palladium ions, or palladium compounds, for example, oxides of palladium. As used herein reference to a "first" with respect to a palladium component is made to distinguish between additional palladium components (e.g., a second palladium component) which may also be present in some embodiments, and which may be the same or different. A first and second palladium component may be referred to synonymously as a "primary" and a "secondary" palladium component, respectively.

The extent to which the palladium of the palladium component exists as palladium ions residing in the ion exchange sites may vary. In the present disclosure, it is to be understood that the first palladium component may reside in the ion-exchange sites of the zeolite, on the surface of the zeolite, or both. In some embodiments, at least 10%, at least 20%, at least 30%, at least 40%, at least 50%, at least 60%, at least 70%, at least 80%, at least 90%, at least 95%, at least 99%, or even 100% of the first palladium component is ion-exchanged in the first zeolite.

In some embodiments, a portion of the first palladium component is ion-exchanged in the second zeolite. In embodiments where a portion of the first palladium component is ion-exchanged in the second zeolite, the portion of the first palladium component ion-exchanged in the second zeolite may range from about 10% to about 90%. For example, from about 10% to about 90% of the first palladium component is ion-exchanged in the first zeolite, and from about 90% to about 10% of the first palladium component is ion-exchanged in the second zeolite. In some embodiments, about 50% of the first palladium component is ion-exchanged in the first zeolite, and about 50% of the first palladium component is ion-exchanged in the second zeolite.

The concentration of the first palladium component can vary, but will typically be from about 0.01 wt % to about 10 wt % relative to the total weight of the first and second zeolite present. In some embodiments, the concentration of the first palladium component may be from about 0.1 to about 6% relative to the total weight of the first and second zeolite. Palladium may be present in the zeolite(s), for example, from about 0.1%, about 0.2%, about 0.5%, about 0.7%, about 0.9% or about 1.0%, to about 1.5%, about 2.0%, about 2.5%, about 3.0%, about 3.5%, about 4.0%, about 4.5%, about 5.0%, about 5.5%, or about 6.0% by weight, based on the total weight of the first and second zeolite. Weights of palladium are measured and reported as elemental Pd.

Plurality of Platinum Nanoparticles

LT-NA catalyst compositions as disclosed herein comprise a plurality of platinum nanoparticles. Generally, the platinum in such nanoparticles is substantially in fully reduced form, meaning that at least about 90% of the platinum content is reduced to the metallic form (Pt(0)). In some embodiments, the amount of platinum in fully reduced form is even higher, e.g., at least about 92%, at least about 94%, at least about 95%, at least about 96%, at least about 97%, at least about 98%, or at least about 99% of the platinum is in fully reduced form. The amount of Pt(0) can be determined using ultrafiltration, followed by Inductively Coupled Plasma/Optical Emission Spectrometry (ICP-OES).

The average size of the platinum nanoparticles in the LT-NA catalyst compositions can vary. In some embodiments, the platinum nanoparticles may have average particle sizes (in fresh/calcined form) of about 1 nm to about 50 nm, e.g., about 1 nm to about 20 nm, or about 1 to about 10 nm, such as an average particle size of about 1 nm, about 3 nm, about 5 nm, about 10 nm, about 15 nm, about 20 nm, about 25 nm, about 30 nm, about 35 nm, about 40 nm, about 45 nm, or about 50 nm. Certain embodiments can have average particle sizes (in fresh/calcined form) of about 1-3 nm.

In some embodiments, the LT-NA catalyst composition as described herein is fresh. In such embodiments, average particle size ranges describe platinum nanoparticles in that have not been aged (e.g., which have not been). In other embodiments, the LT-NA catalyst composition has been aged (i.e., "degreened"). By "aged" or "degreened" it is meant that the composition, or an article comprising such composition, has been exposed to an elevated temperature (e.g., subjected to temperatures greater than about 700° C., 800° C., 900° C., or 1000° C.) for an extended period of time, simulating conditions to which the compositions would be exposed during use in a vehicle exhaust treatment system. Such aging may be referred to as "hydrothermal aging."

In some embodiments, the platinum nanoparticles in the LT-NA catalyst compositions disclosed herein are substantially monodisperse with respect to particle size, meaning the nanoparticle population is highly uniform in particle size. Certain monodisperse platinum nanoparticle populations useful in the present invention can be characterized as consisting of particles wherein at least 90% of the particles have a particle size within 50 percent of the average particle size for the particle population, or within 20 percent, or within 15 percent, within 10 percent, or within 5 percent (i.e., wherein at least 90% of all particles in the population have a particle size within the given percentage range around the average particle size). In other embodiments, at least 95%, 96%, 97%, 98%, or 99% of all particles fall within these ranges. In one exemplary embodiment, the average particle size is about 25 nm and at least 90% of all particles (or at least 95%, 96%, 97%, 98%, 99%, or 100%) of all particles in the population have a particle size in the range of about 12.5 nm to about 37.5 nm (i.e., within about 50 percent of the average particle size). In some embodiments, the average particle size is about 25 nm and at least 90% of all particles (or at least 95%, 96%, 97%, 98%, 99%, or 100%) of all particles in the population have a particle size in the range of about 18.75 nm to about 31.25 nm (i.e., within about 25 percent of the average particle size). In some embodiments, the average particle size is about 25 nm and at least 90% of all particles (or at least 95%, 96%, 97%, 98%, 99%, or 100%) of all particles in the population have a particle size in the range of about 22.5 nm to about 27.5 nm (i.e., within about 10 percent of the average particle size). Specific platinum nanoparticle samples for use herein are substantially monodisperse, with average platinum nanoparticle sizes of about 20 nm, about 25 nm, about 30 nm, about 35 nm, or about 40 nm.

Particle sizes and size distributions of platinum nanoparticles can be determined using Transmission Electron Microscopy (TEM). Such TEM evaluations can be done based, e.g., on calcined supported platinum nanoparticles (e.g., as shown in the Figures). Such values can be found by visually examining a TEM image, measuring the diameter of the particles in the image, and calculating the average particle size of the measured particles based on magnification of the TEM image. The particle size of a particle refers to the smallest diameter sphere that will completely enclose the particle, and this measurement relates to an individual particle as opposed to an agglomeration of two or more particles. The above-noted size ranges are average values for particles having a distribution of sizes.

Distributions of particle sizes and percentages of particles having sizes within a particular range can be determined, e.g., from TEM or Scanning Electron Microscopy (SEM) by coating calcined supported platinum nanoparticles onto a substrate. The calcined supported platinum nanoparticles on the substrate can be directly analyzed by TEM or SEM (looking at the coated substrate) or can be analyzed by scraping or otherwise removing at least a portion of the calcined supported platinum nanoparticles from the substrate and obtaining an image of the scraped/removed supported platinum nanoparticles.

The quantity of platinum particles present in the present LT-NA catalyst compositions may vary. In some embodiments, the platinum nanoparticles are present in an amount of from about 0.1 to about 10% by weight, based on the weight of the first zeolite, and calculated as elemental platinum. In some embodiments, the platinum nanoparticles are present in an amount of from about 1 to about 6% by weight. In some embodiments, the platinum nanoparticles are present in an amount of from about 2 to about 4% by weight. In some embodiments, the platinum nanoparticles are present in an amount of about 0.1, about 0.5, about 1, about 2, about 3, about 4, about 5, about 6, about 7, about 8, about 9, or about 10% by weight of the first zeolite.

In some embodiments, at least a portion of the platinum nanoparticles are disposed on the first zeolite. In some embodiments, all of the platinum nanoparticles are disposed on the first zeolite. In some embodiments, a portion of the platinum nanoparticles are disposed on the second zeolite. In some embodiments, the platinum nanoparticles are disposed on the first zeolite and the second zeolite. In some embodiments, a portion of the platinum nanoparticles are disposed on a solid support material, e.g., on a refractory metal oxide component. In some embodiments, the platinum nanoparticles are disposed on both the first zeolite and the solid support material, e.g., on a refractory metal oxide component. In some embodiments, the platinum nanoparticles are disposed on the first zeolite, the second zeolite, and the solid support material, e.g., on a refractory metal oxide component.

The relative quantities of platinum nanoparticles on each of the first zeolite, the second zeolite, and the refractory metal oxide component may vary. For example, in some embodiments, from about 10% to about 100%, e.g., from about 10%, about 20%, about 30%, about 40%, or about 50%, to about 60%, about 70%, about 80%, or about 90% of the platinum nanoparticles are disposed on the first zeolite. In some embodiments, from about 10% to about 90%, e.g., from about 10%, about 20%, about 30%, about 40%, or about 50%, to about 60%, about 70%, about 80%, or about 90% of the platinum nanoparticles are disposed on the second zeolite. In some embodiments, from about 1% to about 50%, e.g., from about 1%, about 5%, about 10%, or about 20%, to about 30%, about 40%, or about 50%, of the platinum nanoparticles are disposed on the refractory metal oxide component.

The support material on which the platinum nanoparticles are disposed, for example, may comprise a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 $m^2/g$ to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 $m^2/g$ to about 350 $m^2/g$, for example from about 90 $m^2/g$ to about 250 $m^2/g$. In some embodiments, the first refractory metal oxide component comprises gamma alumina or alumina doped with from about 2% to about 10% $SiO_2$.

The ratio by weight of the zeolite (i.e., the total of the first, and when present, the second zeolite) to the first refractory metal oxide component may vary. In some embodiments, the ratio of zeolite to the first refractory metal oxide component by weight is from about 10 to about 0.1; for example, from about 10, about 9, about 8, about 7, about 6, about 5, about 4, about 3, about 2, or about 1, to about 0.9, about 0.8, about 0.7, about 0.6, about 0.5, about 0.4, about 0.3, about 0.2, or about 0.1.

Diesel Oxidation Catalyst (DOC) Composition

In some embodiments, the LT-NA catalyst articles disclosed herein further comprise a diesel oxidation catalyst (DOC) composition. Various such DOC compositions are known for use in treating the exhaust of diesel engines in order to convert both hydrocarbon (HC) and carbon monoxide (CO) gaseous pollutants by catalyzing the oxidation of these pollutants to carbon dioxide and water. Generally, a DOC composition comprises one or more platinum group metal (PGM) components dispersed on a support, such as a refractory metal support. The term "PGM component" as used herein refers to any component that includes a PGM (e.g., Ru, Rh, Os, Ir, Pd, Pt and/or Au). Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide (e.g., including, but not limited to, platinum or an oxide thereof).

In some embodiments, the DOC composition disclosed herein comprises a palladium component (referred to herein as a "second palladium component" so as to distinguish it from the first palladium component associated with the LT-NA composition disclosed above). As with "first palladium component", the term "second palladium component" as used herein refers to palladium metal, palladium ions, or palladium compounds, for example, oxides of palladium. In particular embodiments, the DOC composition disclosed herein comprises a second palladium component, and further comprises a platinum component. In some embodiments, the Pt/Pd ratio of the DOC composition is from about 10:1 to about 1:10. In some embodiments, the Pt/Pd weight ratio is about 2:1.

The Pd component and, when present, the Pt component, may together be present in an amount in the range of about 0.01 to about 20% on a metal basis, based on the total weight of the DOC composition. The DOC composition may comprise, for example, a Pd, Pt, or Pd/Pt component at from about 0.1 wt %, about 0.5 wt %, about 1.0 wt %, about 1.5 wt % or about 2.0 wt %, to about 3 wt %, about 5 wt %, about 7 wt %, about 9 wt %, about 10 wt %, about 12 wt %, about 15 wt %, about 16 wt %, about 17 wt %, about 18 wt %, about 19 wt % or about 20 wt %, based on the weight of the dry DOC composition.

Typically, the second palladium component, the Pt component, or both, are supported on a support material (wherein the support material on which the platinum component and the palladium component are supported can be the same or different). Support materials can be zeolitic or non-zeolitic. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolite supports include, but are not limited to, high surface area refractory metal oxides as described herein above. Accordingly, in some embodiments, the DOC composition comprises a refractory metal oxide component (referred to herein as a "second refractory metal oxide component" so as to distinguish it from the first refractory metal oxide component associated with the LT-NA composition disclosed above), wherein the second palladium component is supported on the second refractory metal oxide component. Generally useful refractory metal oxides for the DOC composition are typically alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. In certain embodiments, refractory metal oxide supports useful in the DOC catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$). In some embodiments, the second refractory metal oxide comprises gamma alumina or alumina doped with about 2% to about 10% $SiO_2$.

The DOC catalyst composition may comprise any of the above named second refractory metal oxides and in any amount. For example, second refractory metal oxides in the catalyst composition may comprise from about 15 wt %, about 20 wt %, about 25 wt %, about 30 wt % or about 35 wt %, to about 50 wt %, about 55 wt %, about 60 wt % about 65 wt % or about 70 wt %, based on the total dry weight of the DOC catalyst composition. The DOC catalyst composition may, for example, comprise from about 10 to about 99 wt % Si-doped alumina, from about 15 to about 95 wt % Si-doped alumina, or from about 20 to about 85 wt % Si-doped alumina.

In some embodiments, the DOC composition further comprises a zeolite as described herein (referred to herein as a "third zeolite" so as to distinguish it from the first zeolite and second zeolite associated with the LT-NA composition disclosed above). In some embodiments, the third zeolite comprises beta zeolite (BEA). In some embodiments, the BEA is substantially free of any platinum-group metal (PGM) species.

Preparation of Catalytic Compositions

The disclosed LT-NA catalyst and DOC compositions may, in some embodiments, be prepared via an incipient wetness impregnation method. Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support (e.g., zeolite or refractory metal oxide) containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying. One of skill in the art will recognize other methods for loading the metal components into the supports of the present compositions, for example, adsorption, ion-exchange, precipitation, and the like.

For example, palladium may be impregnated on a zeolite (e.g., the first and/or second zeolite) in the preparation of components of the LT-NA catalyst composition. Palladium salts useful for introduction of palladium to the zeolite include, but are not limited to, nitrate salts.

In some embodiments, the palladium component is ion-exchanged in the zeolite (e.g., the first and/or second zeolite). Ion exchange is a process commonly used for exchanging ions residing in a porous support with an outside metal ion of interest. The zeolite framework contains open voids in the form of channels and cages which are normally occupied by water molecules and extra-skeletal cations which can be replaced. An aluminum atom attracts an excess negative charge which is compensated for by these cations. The interior of the pore system is represented by the catalytically active surface. The more aluminum and the less silicon a zeolite contains, the denser is the negative charge in its lattice and the more polar its inner surface.

Because of the presence of 2- or 3-valent cations as tetrahedron centers in the zeolite skeleton, the zeolite receives a negative charge in the form of so-called anion sites in whose vicinity the corresponding cation positions are located. The negative charge is compensated for by incorporating cations, e.g. metal cations, into the pores of the zeolite material. Cations that balance the charge of the anionic framework are loosely associated with the framework oxygens, and the remaining pore volume is filled with water molecules. The non-framework cations are generally exchangeable, and the water molecules removable. These voids and channels are characteristic for each zeolite. The term "exchange sites" refers to sites available for cations, which are mainly occupied by ion-exchanged metal cations, which are intentionally added to the zeolite (e.g., palladium).

Without wishing to be bound by theory, a high zeolite sodium content may negatively impact hydrothermal stability. Therefore, a low content of sodium and alkali metals in the zeolites as described herein is generally preferred. In certain embodiments, the zeolite has an alkali content of less than 3 wt %, more preferably less than 1 wt %, and even more preferably less than 0.1 wt % based on the total weight of the calcined zeolite (reported as the alkali metal oxide on a volatile-free basis). In some embodiments, low alkali content zeolites can be provided by ion exchanging sodium (Na) form zeolites to the ammonium ($NH_4$) form. $NH_4$ ion exchange into the zeolite may be carried out at room temperature or at a temperature up to about 80° C. over a period of about 1 to 24 hours. In some embodiments, the resulting zeolite material may preferably be dried at about 100 to 120° C., to afford an $NH_4$-exchanged zeolite. In some embodiments, the $NH_4$-exchanged zeolite may be calcined at a temperature of at least about 450° C. to afford an H-exchanged zeolite.

For example, zeolites prepared with sodium or $NH_4^+$ ions residing in the pores can be exchanged with e.g., palladium ions to form a palladium ion-exchanged zeolite. This is accomplished by preparing a slurry of the zeolite in a solution containing the palladium ion. Heat may be optionally applied during this process. The palladium ion can now diffuse into the pores of the zeolite and exchange with the residing ions, i.e., $Na^+$ or $NH_4^+$, to form the palladium ion-exchanged zeolite. By "palladium ion exchanged" it is meant that at least a portion of the ion exchange sites are occupied by palladium ions. In particular it is preferred that more than 50% of the exchangeable sites are exchanged, and preferably, more than 70% of the exchangeable sites are exchanged with palladium.

According to the present disclosure, a LT-NA catalyst composition is generally prepared by associating a colloidal dispersion of platinum (Pt) nanoparticles with any or all of the first zeolite, the second zeolite, and the refractory oxide support material, each as described herein. Such colloidal dispersions can, in some embodiments, comprise: a plurality of Pt nanoparticles; or, a composition by which a plurality of Pt nanoparticles is provided, comprising: a) a platinum metal precursor, b) a dispersion medium, c) a stabilizing agent, and d) reducing agent. Advantageously, the Pt in colloidal dispersions useful according to the disclosure is substantially in fully reduced form, meaning that at least about 90% of the Pt content (i.e., the bulk of the nanoparticle) is reduced to the metallic form (Pt(0)). The platinum metal precursor can, in some embodiments, be selected from the group consisting of ammine complex salts, hydroxyl salts, nitrates, carboxylic acid salts, ammonium salts, and oxides (e.g., selected from $Pt(NH_3)_4(OH)_2$, Pt nitrate, Pt citrate, and the like). As prepared, the Pt colloidal dispersions can have varying concentrations of Pt nanoparticles, e.g., about 1% to about 10% by weight, e.g., about 2% to about 6% by weight, about 2% to about 5% by weight, or about 4% to about 6% by weight, with no further processing (e.g., concentrating steps). Without wishing to be bound by any particular theory, it is believed that impregnation of the first zeolite with colloidal Pt using preformed Pt nanoparticles may ensure that Pt does not enter the zeolite and become ion-exchanged.

Methods of impregnating supports with colloidal Pt and PGM materials, are described in for example, US2017/0304805 to Xu et al. and US2019/0015781 to Wei et al., both of which are incorporated by reference herein in their entirety.

Similarly, for preparation of the DOC compositions as disclosed herein, generally, aqueous solutions of soluble compounds or complexes of the platinum group metals (PGMs) are used to impregnate the support material (e.g., a refractory metal oxide). Non-limiting examples of suitable compounds include palladium nitrate, tetraammine palladium nitrate, tetraammine platinum acetate, and platinum nitrate. During the calcination steps, or at least during the initial phase of use of the composite, such compounds are converted into a catalytically active form of the metal or a compound thereof. A suitable method of preparing a DOC catalyst composition is to prepare a mixture of a solution of a desired PGM compounds (e.g., a platinum compound and/or a palladium compound) and at least one support, such as a finely divided, high surface area, refractory metal oxide support, e.g., Silica-doped alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Catalytic Articles

In one or more embodiments, the present LT-NA compositions are disposed (coated) on a substrate to form a catalytic article (i.e., a catalytic component or catalytic article). Such articles are part of an exhaust gas treatment system (e.g., catalyst articles including, but not limited to, articles including the LT-NA compositions disclosed herein). As used herein, the terms "catalyst article," "catalytic article," "catalyst component," "catalytic component," "article," and "component" are used interchangeably and without regard to any specific catalytic activity. For example, a LT-NA article may be referred to as a catalytic article, however, without wishing to be bound by any particular theory of operation, it is recognized that such an article possesses an adsorptive rather than a catalytic function. Similarly, a "composition" and "catalyst composition" are used interchangeably herein and without regard to any specific catalytic activity.

In one aspect of the present disclosure is provided a catalyst article for treating an exhaust stream of an internal combustion engine, the catalyst article comprising a substrate having an inlet end and an outlet end defining an overall length; and a first washcoat comprising the LT-NA composition as disclosed herein disposed on at least a portion thereof. In some embodiments, the catalyst article as disclosed herein further comprises a second washcoat comprising a diesel oxidation catalyst (DOC) composition disposed on at least a portion of the substrate in a layered or zoned configuration.

To produce catalytic articles, a substrate is coated with a catalytic composition as disclosed herein (i.e., an LT-NA and/or DOC composition). The coatings are "catalytic coatings" or "catalytic coatings." The terms "catalyst composition" and "catalytic coating composition" are synonymous.

Coating Compositions

Coating compositions comprising the LT-NA and/or DOC compositions as disclosed herein may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively the binder can be zirconia-based or silica-based, for example zirconium acetate, zirconia sol or silica sol. When present, the alumina binder is typically used in an amount of about 0.05 $g/in^3$ to about 1 $g/in^3$.

Substrates

Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein (e.g., a LT-NA catalyst composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$ or about 1000 cm$^3$ to about 1500 cm$^3$, about 2000 cm$^3$, about 2500 cm$^3$, about 3000 cm$^3$, about 3500 cm$^3$, about 4000 cm$^3$, about 4500 cm$^3$ or about 5000 cm$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of >50%, >60%, >65% or 70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coating Layers

A substrate is coated with a LT-NA and/or DOC composition as disclosed herein to form an article. The coating may comprise one or more thin, adherent coating layers disposed on and in adherence to least a portion of a substrate. In some embodiment, the present articles may include the use of one or more layers and combinations of one or more layers. Coating compositions may be present on the inlet side of the substrate wall alone, the outlet side alone, both the inlet and outlet sides, or the wall itself may consist all, or in part, of the coating composition The coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The coating layer(s) may comprise the individual functional components, that is, an LT-NA composition, and/or a DOC catalyst composition each as described herein.

A catalyst composition may typically be applied in the form of a washcoat, containing support material having catalytically active species thereon. Catalyst components may also, in some embodiments, be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

The above-noted catalyst composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 10 to about 40 microns, preferably 10 to about 30 microns, more preferably about 10 to about 15 microns.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise the LT-NA composition as disclosed herein, and another coating layer could comprise the DOC composition as disclosed herein. Alternatively, in some embodiments, the LT-NA composition and the DOC composition, each as disclosed herein, may be combined and applied to a substrate as a single homogenous layer. In a further embodiment, the LT-NA composition may be present in one layer, and the DOC composition components may be divided among one or more additional layers.

Thus, discussion related to different layers may correspond to any of these layers. The catalytic coating may comprise one, two or three or more coating layers. The one or more coating layers together comprise the catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

In some embodiments, the first washcoat is disposed directly on the substrate, and the second washcoat is disposed on at least a portion of the first washcoat. In some embodiments, the second washcoat is disposed directly on the substrate and the first washcoat is disposed on at least a portion of the second washcoat. In some embodiments, the first and second washcoat compositions are combined and disposed on the substrate as a single homogenous layer. In some embodiments, the catalyst article has a zoned configuration, wherein the first washcoat is disposed on the catalyst substrate from the inlet end to a length from about 10% to about 70% of the overall length; and wherein the second washcoat is disposed on the catalyst substrate from the outlet end to a length from about 30 to about 90% of the overall length.

Figure 3A:
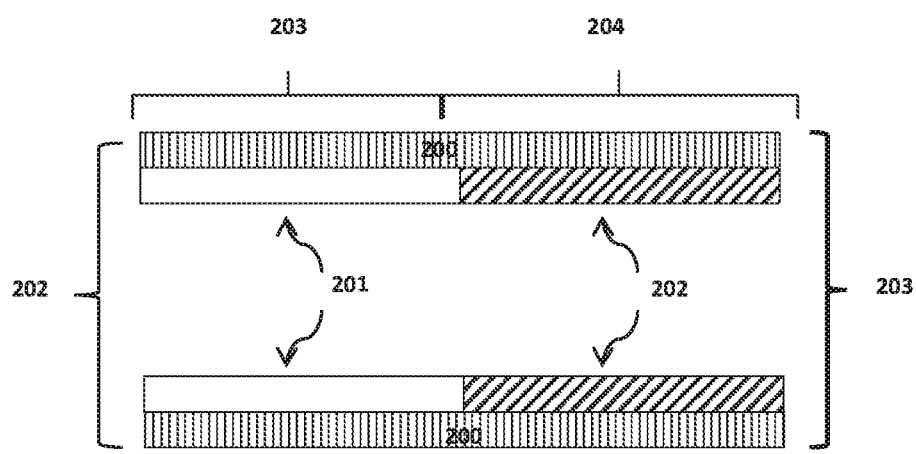
FIG. 3A is a cross-sectional view of an embodiment of a zoned catalytic article of the present disclosure.
Figure 3B:
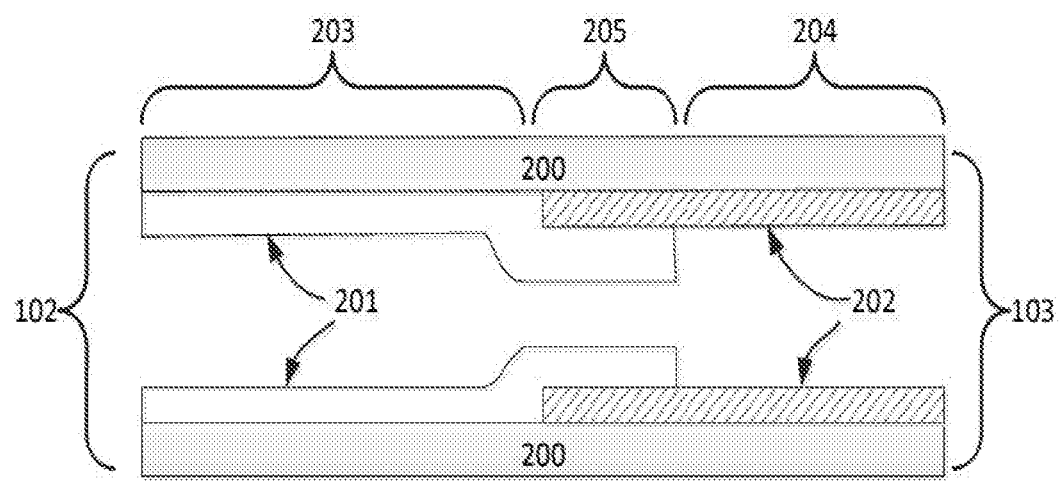
FIG. 3B is a cross-sectional view of an embodiment of a layered catalytic article of the present disclosure.
Figure 3C:
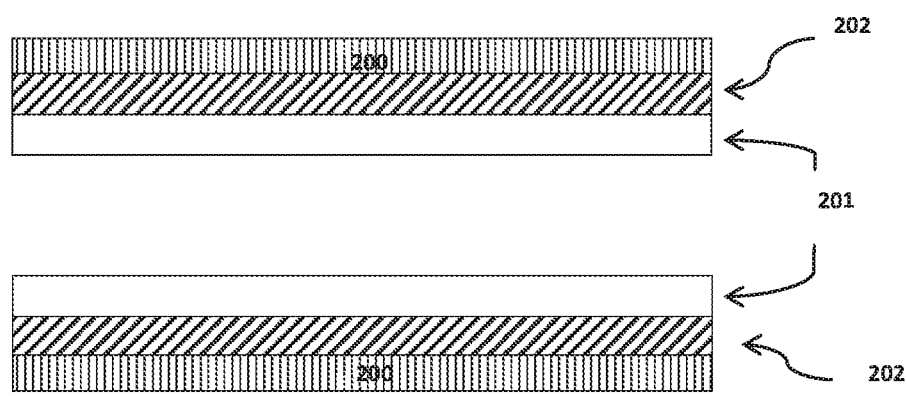
FIG. 3C is a cross-sectional view of another embodiment of a layered catalytic article of the present disclosure.

FIGS. 3A, 3B and 3C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 3B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 3C, coating layers 201 and 202 each extend the entire length of the substrate with layer 201 overlaying layer 202. The substrate of FIG. 3C does not contain a zoned coating configuration. FIGS. 3A, 3B and 3C may be useful to illustrate coating compositions on the wall-through substrate. FIGS. 3A, 3B and 3C may further be useful to illustrate coating compositions on the flow-through substrate, as described herein below. Configurations of such coating layers are not limited.

In some embodiments, the DOC composition is in a zoned configuration relative to the LT-NA composition layer(s). In some embodiments, the DOC composition may overlap one or more layers of the LT-NA composition. In some embodiments, the LT-NA catalyst composition and the DOC composition are present on a substrate in a single homogenous layer. In some embodiments, the LT-NA catalyst composition and the DOC composition are present in separate, discrete layers. In some embodiments, the LT-NA catalyst composition and the DOC composition are present in a zoned configuration. In some embodiments, other catalytic compositions can be incorporated on, under, or between any of the LT-NA and DOC catalyst composition layers referenced herein.

Loading of the present catalytic coatings (e.g., LT-NA and/or DOC) on a substrate will depend on substrate properties such as porosity and wall thickness. Typically, wall-flow filter catalyst loading will be lower than catalyst loadings on a flow-through substrate. Catalyzed wall-flow filters are disclosed, for instance, in U.S. Pat. No. 7,229,597, which is incorporated herein by reference in its entirety. The present LT-NA and/or DOC catalyst compositions are generally present on the substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the substrate. Concentration of a catalyst composition, or any other component, on a substrate refers to concentration per any one three-dimensional section or zone, for instance any cross-section of a substrate or of the entire substrate.

In some embodiments, the catalytic article comprises the first Pd component at a loading from about 15 $g/ft^3$ to about 200 $g/ft^3$ or from about 60 $g/ft^3$ to about 120 $g/ft^3$.

In some embodiments, the LT-NA article comprises a zeolite (e.g., the first and second zeolite) loading of from about 1 $g/in^3$ to about 5 $g/in^3$ or from about 2 $g/in^3$ to about 3 $g/in^3$.

In some embodiments, the catalytic article comprises the Pt nanoparticles at a loading from about 15 $g/ft^3$ to about 200 $g/ft^3$.

Exhaust Gas Treatment Systems

The present disclosure further provides an exhaust gas treatment system for reducing a $NO_x$ level in an exhaust gas stream from an internal combustion engine, the exhaust gas treatment system comprising a LT-NA catalytic article as disclosed herein. In another aspect of the present invention is provided a method for reducing a $NO_x$ level in an exhaust gas stream from an internal combustion engine, the method comprising contacting the exhaust gas stream with a LT-NA catalytic article as disclosed herein, or an emission treatment system as disclosed herein. The present invention therefore provides an emission treatment system that incorporates the catalytic articles described herein, such as an emission treatment system generally comprising an engine producing an exhaust gas stream and one or more catalytic articles positioned downstream from the engine in fluid communication with the exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a LT-NA catalyst article, which can comprise a flow-through or wall-flow filter substrate, as disclosed herein. In particular, systems comprise a LT-NA catalyst article suitable for adsorbing $NO_x$ at low temperatures and releasing trapped $NO_x$ at elevated temperatures. The $NO_x$ adsorption component of the present catalyst compositions provide desirable $NO_x$ adsorption and desorption properties under various engine operating conditions.

Preferably, the LT-NA catalyst article is capable of adsorbing a significant portion of the NO present in the exhaust gas stream. More importantly however, the LT-NA catalyst article does not release NO species until the exhaust gas stream and/or the exhaust gas emission system has reached a temperature high enough for other catalytic components to be active. Only then can the released NO be converted efficiently to $N_2$ and exit the exhaust gas treatment system. As such the LT-NA catalyst article is generally located upstream of any catalytic components responsible for the conversion of NO released from the LT-NA. In some embodiments, the LT-NA catalyst article adsorbs NO species present in the exhaust gas stream at low temperatures, which may have optionally been treated with at least a DOC and/or CSF component.

In some embodiments, the LT-NA catalyst article is not located in a separate component (e.g., on a separate substrate) but can be included in the same component, such as the diesel oxidation catalyst (DOC), catalyzed soot filter (CSF), or catalytic selective reduction (SCR) catalyst component, wherein the catalytic compositions for such components are applied to the substrate in a zoned or layered configuration. In some embodiments, the LT-NA and the (DOC) are combined in a single catalyst article.

Systems of the present disclosure can contain, in addition to the LT-NA catalyst article, for example, a DOC, a reductant injector, SCR catalyst component, a soot filter (which can be catalyzed or uncatalyzed), and/or an ammonia oxidation catalyst ($AMO_x$). A suitable DOC for use in the emission treatment system is able to effectively catalyze the oxidation of CO and HC to carbon dioxide ($CO_2$). Preferably, the DOC is capable of converting at least 50% of the CO or HC component present in the exhaust gas. The DOC may be located, for example, downstream of the LT-NA catalyst article. In some embodiments, the DOC is located upstream of an SCR catalyst component and/or soot filter.

The exhaust gas treatment system of the present disclosure may further comprise an SCR catalyst component. The SCR catalyst component may be located upstream or downstream of the DOC and/or soot filter. A suitable SCR catalyst component for use in the emission treatment system is able to effectively catalyze the reduction of the $NO_x$ exhaust component at temperatures as high as 650° C. In addition, the SCR catalyst component must be active for reduction of $NO_x$ even under conditions of low load which typically are associated with lower exhaust temperatures. Preferably, the SCR catalyst component is capable of converting at least 50% of the $NO_x$ (e.g., NO) component to $N_2$, depending on the amount of reductant added to the system. Another desirable attribute for the SCR catalyst component is that it possesses the ability to catalyze the reaction of $O_2$ with any excess $NH_3$ to form $N_2$, so that $NH_3$ is not emitted to the atmosphere. Useful SCR catalyst components used in the emission treatment system should also have thermal resistance to temperatures greater than 650° C. Such high temperatures may be encountered during regeneration of the catalyzed soot filter. Suitable SCR catalyst components are described, for instance, in U.S. Pat. Nos. 4,961,917 and 5,516,497, each of which is incorporated herein by reference in its entirety.

In some embodiments, the exhaust gas treatment system further comprises one or more of a lean $NO_x$ trap (LNT), a selective catalytic reduction (SCR) catalyst, an ammonia or ammonia precursor injection component, a catalyzed soot filter (CSF), or an ammonia oxidation (AMOx) catalyst.

Figure 4:
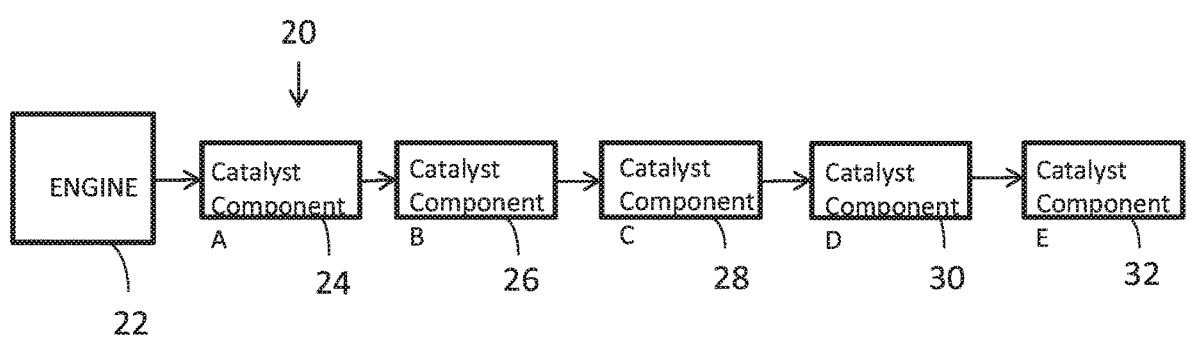
FIG. 4 is a schematic depiction of an embodiment of an exhaust gas treatment system comprising a LT-NA article of the present disclosure in combination with additional emission treatment system components.

Certain exemplified exhaust gas treatment systems may be more readily appreciated by reference to FIG. 4, which depicts a schematic representation of a non-limiting exhaust gas treatment system 20 in accordance with embodiments of the present disclosure. One of skill in the art will recognize that it may be desirable to arrange the relative position of each article in a different order than illustrated herein; such alternative ordering is contemplated by the present disclosure. As shown, the emission treatment system 20 can include a plurality of catalyst components in series downstream of an engine 22, such as a diesel engine. At least one of the catalyst components will be the LT-NA catalyst of the invention as set forth herein. The catalyst composition of the invention could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example. One of skill in the art will recognize that it may be desirable to arrange the relative position of each article in a different order than illustrated herein; such alternative ordering is contemplated by the present disclosure.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

Reference to SCR in the table refers to an SCR catalyst; any suitable SCR catalyst known in the art may be utilized.

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst components mounted in a position near the engine (in a close-coupled position, CC), with additional catalyst components in a position underneath the vehicle body (in an underfloor position, UF). In one or more embodiments, the exhaust gas treatment system may further comprise a urea injection component.

TABLE 1

Possible exhaust gas treatment system configurations

| Component A | Component B | Component C | Component D | Component E |
|---|---|---|---|---|
| DOC | LT-NA | CSF | SCR | Optional AMOx |
| LT-NA | DOC | CSF | SCR | Optional AMOx |
| DOC | LT-NA | SCR | CSF | Optional AMOx |
| LT-NA | DOC | SCR | CSF | Optional AMOx |
| LT-NA/DOC | CSF | SCR | Optional AMOx | — |
| LT-NA/DOC | SCRoF | Optional AMOx | — | — |
| LT-NA/DOC | LNT | SCR | Optional AMOx | — |
| DOC | LT-NA/DOC | SCR | Optional AMOx | — |
| DOC | LT-NA/DOC | LNT | SCR | Optional AMOx |

Any exemplified exhaust gas treatment system depicted by FIG. 4 may be followed by a selective ammonia oxidation catalyst (AMOx) to remove $NH_3$ released from the SCR catalyst component and selectively oxidize it to $N_2$.

Method of Treating an Exhaust Gas Stream

Aspects of the current disclosure are directed towards a method for reducing a $NO_x$ level in an exhaust gas stream from an internal combustion engine, the method comprising contacting the exhaust gas stream with the LT-NA catalyst article of the present disclosure, or the exhaust gas treatment system of the present disclosure.

In some embodiments, the method comprises continually passing the exhaust gas stream into contact with the LT-NA catalyst article, the exhaust gas stream being at an initial temperature at or below about 150° C. and progressively warming during further engine operation; adsorbing and storing the $NO_x$ from the exhaust gas stream until the exhaust gas stream reaches a predetermined temperature, wherein the $NO_x$ is released into the exhaust gas stream exiting the LT-NA article; and continually passing the exhaust gas stream exiting the LT-NA article into contact with at least one downstream catalytic material for removal of $NO_x$ components as the exhaust gas stream increases in temperature and heats each such downstream catalytic material to an operating temperature of between about 200° C. and about 450° C.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Preparation of Monolithic Catalyst Articles

Various embodiments of the present disclosure were prepared according to the Examples below. The composition of each article is summarized below in Table 2.

Example 1. (LT-NA; Reference Article)

A Ferrierite zeolite material (FER) was incipient wetness impregnated with a dilute $Pd(NO_3)_2$ solution, then dried in air at 110° C./2 h, followed by calcination in air at 550° C. for 1 hour. A dilute Zr acetate solution was prepared, to which the calcined Pd/FER powder was added, to form a slurry suspension at approximately 50% solids content. The slurry was milled until the final particle size $D_{90}$ reached 10-12 m. The slurry was then coated at 42-46% solids content onto a 400/4 honeycomb substrate. After drying, the catalyst was calcined at 590° C. for 1 hour in air. The Pd loading was 80 g/ft³, the zeolite washcoat loading was 2.5 g/in³, and the resulting $ZrO_2$ loading was ~5% of the washcoat composition.

Example 2. (LT-NA; Inventive Article)

A Ferrierite zeolite material (FER) was incipient wetness impregnated with a dilute $Pd(NO_3)_2$ solution, then dried in air at 110° C./2 h, followed with calcination in air at 550° C. for 1 hour. A dilute Zr acetate solution was prepared, to which the calcined Pd/FER powder was added to form a slurry suspension at approximately 50% or higher solids content. The slurry was milled until the final particle size Do reached 10-12 m. To this slurry, a colloidal Pt solution was added dropwise. A colloidal Pt solution containing preformed Pt nanoparticles was used to ensure that Pt did not enter the zeolite pores and become ion-exchanged. The slurry was then coated at 40-46% solids content onto a 400/4 honeycomb substrate. After drying, the catalyst was calcined at 590° C. for 1 hour in air. The Pd loading was 80 g/ft³, the zeolite washcoat loading was 2.5 g/in³, the Pt loading was 18 g/ft³ (or ~0.4% Pt on zeolite), and the resulting $ZrO_2$ loading was ~5% of the washcoat composition.

Example 3. (LT-NA; Inventive Articles)

Two catalyst compositions having different Pt/Pd ratios were prepared. A zeolite Ferrierite material (FER) was incipient wetness impregnated with a diluted Pd (NO$_3$)$_2$ solution, then dried in air at 110° C./2 h, followed with calcination in air at 550° C. for 1 hour. A diluted Zr acetate solution was prepared, to which the calcined Pd/FER powder was added to form a slurry suspension at approximately 50% or higher solid content. The slurry was milled until the final particle size Do reached 10-12 □m. To this slurry, a colloidal Pt solution was added dropwise, followed by dropwise addition of a Pd nitrate precursor solution. The slurry was then coated at 40-46% solid content onto a 400/4 honeycomb substrate. After drying, the catalyst was calcined at 590° C. for 1 hour in air. The Pd loading on zeolite through impregnation was 80 g/ft$^3$, the zeolite washcoat loading was 2.5 g/in$^3$, the total post-addition Pt—Pd loading was 18 g/ft$^3$ (or ~0.4% Pt—Pd on zeolite), at a Pt—Pd ratio of either 10/1 or 2/1.

Example 4. (LT-NA/DOC; Reference Article)

In this example, a Pd/FER slurry (slurry A) and a PGM/Al$_2$O$_3$ slurry (slurry B) were separately prepared, then blended into one slurry prior to substrate coating to form a single, homogenous layer.

Slurry A: A Ferrierite zeolite material (FER) was incipient wetness impregnated with a dilute Pd(NO$_3$)$_2$ solution, then dried in air at 110° C./2 h, followed by calcination in air at 550° C. for 1 hour. A dilute Zr acetate solution was prepared, to which the calcined Pd/FER powder was added to form a slurry suspension at approximately 50% solids content. The slurry was milled until the final particle size Do reached 10-12 μm. The Pd loading was 80 g/ft$^3$, and the zeolite loading was 2.5 g/in$^3$.

Slurry B: A 5% SiO$_2$—Al$_2$O$_3$ support material was incipient wetness impregnated with a dilute Pd nitrate solution, then added to a dilute colloidal Pt solution. The resulting slurry was milled to reach a D$_{90}$ of 10-15 μm, and was then combined with Slurry A to form a single slurry. The substrate was coated as described in the previous Examples. The total Pt—Pd loading was 27 g/ft$^3$, and the Pt/Pd weight ratio was 2/1.

Example 5. (LT-NA/DOC: Reference Article)

In this example, a two-layered embodiment was prepared. A LT-NA bottom layer was prepared similarly to that described for Example 1. For the DOC top layer, a 5% SiO$_2$—Al$_2$O$_3$ material was incipient wetness impregnated with a dilute Pd nitrate solution to form a slurry suspension. The slurry was milled to a D$_{90}$ of 10-15 μm, then Beta zeolite in the H-form (HBEA) and an alumina binder (3.5% of the total washcoat solid) were added. The slurry was then coated at 25-30% solids content onto the Pd/FER/ZrO$_2$ LT-NA bottom layer. After drying, the sample was calcined at 590° C. for 1 hour in air. The Si-alumina loading was 0.75 g/in$^3$, the Beta zeolite loading was 0.35 g/in$^3$, and the Pd loading was 36 g/ft$^3$.

Example 6. (LT-NA/DOC: Inventive Article)

In this example, a two-layered embodiment was prepared. A Pd/FER/ZrO$_2$/colloidal Pt LT-NA bottom layer was prepared in a similar manner to that of Example 2, and the DOC top layer was prepared in a similar manner to that of Example 5.

Example 7. (LT-NA/DOC: Reference Articles)

In this example, two separate two-layered embodiments were prepared, each having different Pt/Pd ratios in the DOC layer. A Pd/FER/ZrO$_2$ LT-NA bottom layer was prepared similarly to Example 1. For the DOC top layers, a 5% SiO$_2$—Al$_2$O$_3$ material was incipient wetness impregnated with a dilute Pd-nitrate solution, then added to a dilute colloidal Pt solution to form a slurry suspension. The pH of the slurry suspension was adjusted to 4-5 with diluted HNO$_3$. The slurry was milled to a D$_{90}$ of 12-15 μm, then Beta zeolite and an alumina binder (3.5% of the total washcoat solid) were added. The slurry was then coated at 25-30% solids content onto the LT-NA bottom layer. After drying, the samples were calcined at 590° C. for 1 hour in air. The Si-alumina loading was 0.75 g/in$^3$, Beta zeolite loading was 0.35 g/in$^3$, the total DOC coat PGM loading was 27 g/ft$^3$, and the Pt/Pd weight ratio of the DOC layer was 2/1 or 1/2.

Example 8 (LT-NA; Reference Article)

A Pd/Beta zeolite (BEA) and a Pd/FER slurry were each prepared using the procedure of Example 1. The Pd % on each individual zeolite was maintained at 1.74%. The two slurries were mixed at a solids ratio of 1/1, and the resulting slurry was coated at 42-46% solid content onto a 400/4 honeycomb substrate. After drying, the catalyst was calcined at 590° C. for 1 hour in air. The total Pd loading was 80 g/ft$^3$, the total zeolite washcoat loading was 2.5 g/in$^3$, and the resulting ZrO$_2$ loading after calcination was ~5% of the washcoat composition.

Example 9 (LT-NA/DOC; Inventive Article)

A Pd/BEA and a Pd/FER slurry was each prepared using the procedure for Example 1. The Pd % on each individual zeolite was maintained at 1.74%. The two slurries were mixed at a solids ratio of 1/1, and 18 g/ft$^3$ colloidal Pt solution was added to the slurry. The resulting slurry was coated at 42-46% solid content onto a 400/4 honeycomb substrate. After drying, the catalyst was calcined at 590° C. for 1 hour in air. The total Pd loading was 80 g/ft$^3$, the total zeolite washcoat loading was 2.5 g/in$^3$, and the resulting ZrO$_2$ loading after calcination was ~5% of the washcoat composition. The Pt/Pd weight ratio was ~¼.

TABLE 2

Catalyst article compositions.

| Ex. # | LT-NA composition | DOC Composition (Pt/Pd ratio) | Article Layering |
|---|---|---|---|
| 1 (Ref) | Pd/FER/ZrO$_2$ | NA | NA |
| 2 | Pd/FER/ZrO$_2$/colloidal Pt | NA | NA |
| 3 | Pd/FER/ZrO$_2$/colloidal Pt/plus Pd | NA | NA |
| 4 (Ref) | Pd/FER/ZrO$_2$ | Pt/Pd/SiO$_2$—Al$_2$O$_3$ (2:1) | single homogenous |
| 5 (Ref) | Pd/FER/ZrO$_2$ | Pd/SiO$_2$—Al$_2$O$_3$/HBEA (0:1) | DOC top layer |

TABLE 2-continued

Catalyst article compositions.

| Ex. # | LT-NA composition | DOC Composition (Pt/Pd ratio) | Article Layering |
|---|---|---|---|
| 6 | Pd/FER/ZrO$_2$/colloidal Pt | Pd/SiO$_2$—Al$_2$O$_3$/HBEA(0:1) | DOC top layer |
| 7 (Ref) | Pd/FER/ZrO$_2$ | Pt—Pd/SiO$_2$—Al$_2$O$_3$/HBEA (2:1 or 1:2) | DOC top layer |
| 8 (Ref) | Pd/FER/BEA/ZrO$_2$ | NA | NA |
| 9 | Pd/FER/BEA/ZrO$_2$/colloidal Pt | NA | NA |

Evaluation of Monolithic Catalyst Articles

The monolith catalyst articles prepared in Examples 1 to 7 above were tested on a diesel vehicle simulator in both steady state and transient tests. The gas mixture in steady state tests consisted of 100 ppm NO, 250 ppm C$_2$H$_4$, 500 ppm 00, 5% H$_2$O, 10% O$_2$, 5% O$_2$ in balancing N$_2$. The catalyst article dimension was 1×1×3", and space velocity was kept constant at 30,000 hW. The catalyst was first treated at 50000/5 minute in O$_2$/H$_2$O/CO$_2$/N$_2$ mixture, then subject to 10-minute adsorption at 100° C. in the full mixture; desorption was carried out from 100° C. to 500° C. in the O$_2$/H$_2$O/CO$_2$/N$_2$ mixture at 20° C./min ramp rate. The adsorption-desorption test was carried out 3 times on each article.

For transient FTP tests, the feed composition was derived from a diesel engine, and NO-only was used for the inlet NO$_x$ feed. Each catalyst was in-situ pretreated at 550° C. for 5 minutes in 10% O$_2$/5% H$_2$O/5% CO$_2$/N$_2$, then subject to three continuous FTP cycles. The cold-start NO$_x$ adsorption efficiency was defined as the percentage of NO$_x$ adsorbed from the start to the point when the inlet temperature first reached 200° C.

Example 10. (Results Comparing Examples 1 and 2)

Figure 5:
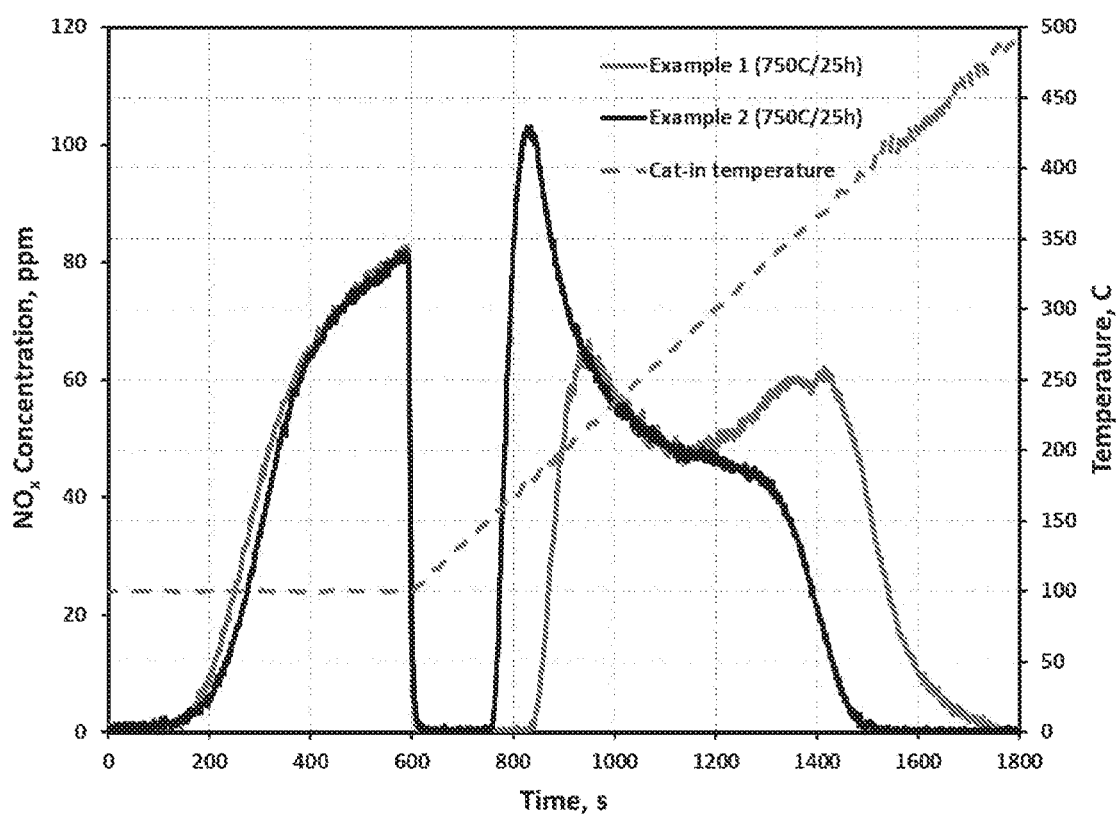
FIG. 5 is a plot of $NO_x$ adsorption/desorption versus time and temperature for embodiments of the present disclosure.

Performance of Example 1 (reference) and Example 2 (inventive) was compared after hydrothermal aging at 750° C. for 25 hours. Both Examples showed a similar adsorption profile and NO$_x$ adsorption capacity (FIG. 5). For NO$_x$ desorption, Example 2 showed both a lower onset temperature and a lower peak temperature for the first desorption. Example 2 also showed a narrower temperature window for the completion of NO$_x$ desorption (151-397° C. for Example 2 vs. 170-476° C. for Example 1). This data demonstrates the surprising beneficial effect of adding colloidal Pt to the Pd-impregnated zeolite material in the LT-NA composition.

Example 11. (Results Comparing Examples 2 and 4)

Figure 6:
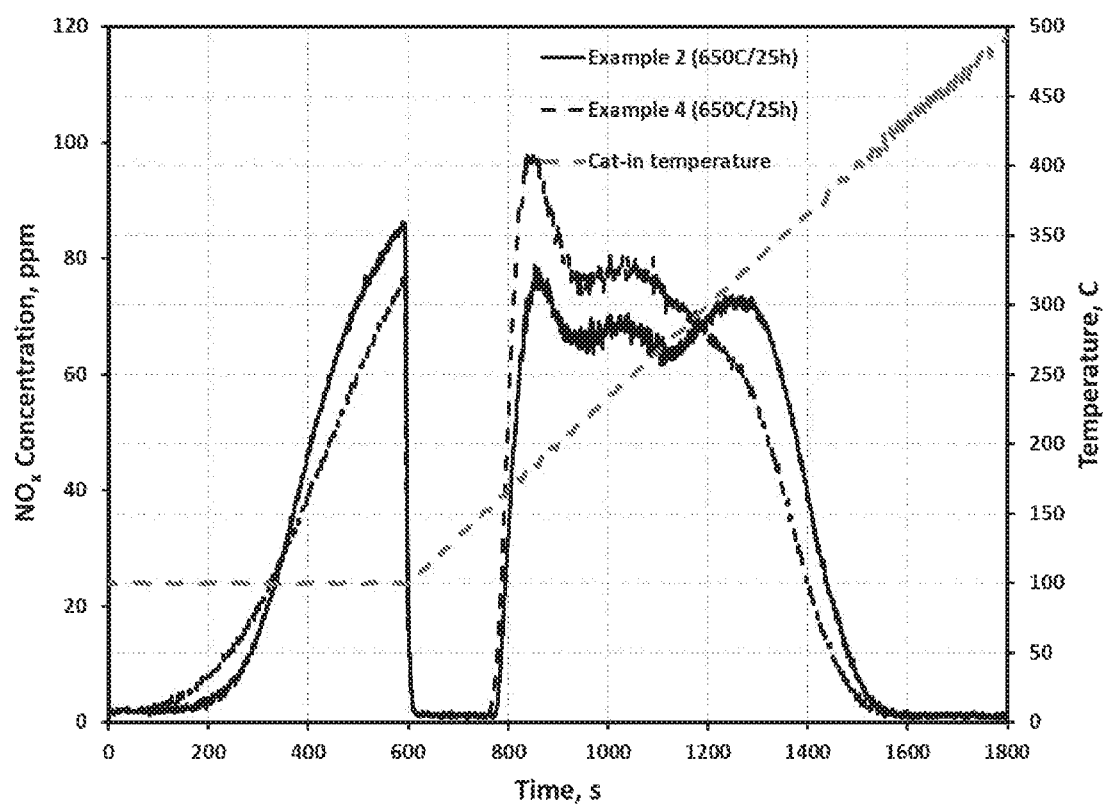
FIG. 6 is a plot of $NO_x$ adsorption/desorption versus time and temperature for embodiments of the present disclosure.

Performance of inventive Example 2 and Example 4 was compared after hydrothermal aging at 750° C. for 25 hours, illustrating the effect of Pt location (i.e., on the zeolite, as in Example 2, or on alumina support as in Example 4). Both Examples showed a similar NO$_x$ desorption profile (FIG. 6). There appeared to be a slightly adverse effect on NO$_x$ adsorption for Example 4, where the Pt was not directly associated with the Pd/zeolite.

Example 12. (Results Comparing Examples 1 and 3)

Figure 7:
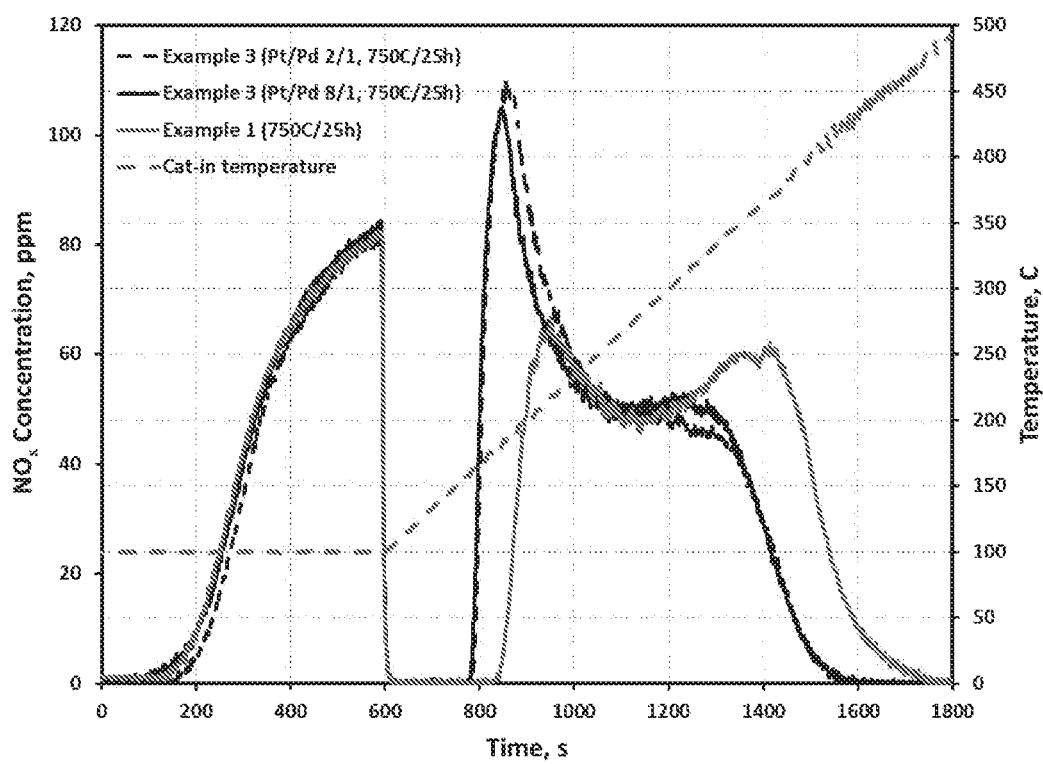
FIG. 7 is a plot of $NO_x$ adsorption/desorption versus time and temperature for embodiments of the present disclosure.

Performance of Example 1 (reference) and two inventive embodiments according to Example 3 (Pt/Pd ratios of 2:1 and 8:1) was compared after hydrothermal aging at 750° C. for 25 hours. Nearly identical activity was observed for both versions of Example 3 (FIG. 7), which both demonstrated a favorable NO$_x$ desorption profile relative to reference Example 1.

Example 13. (Results Comparing Examples 5 and 6)

Figure 8:
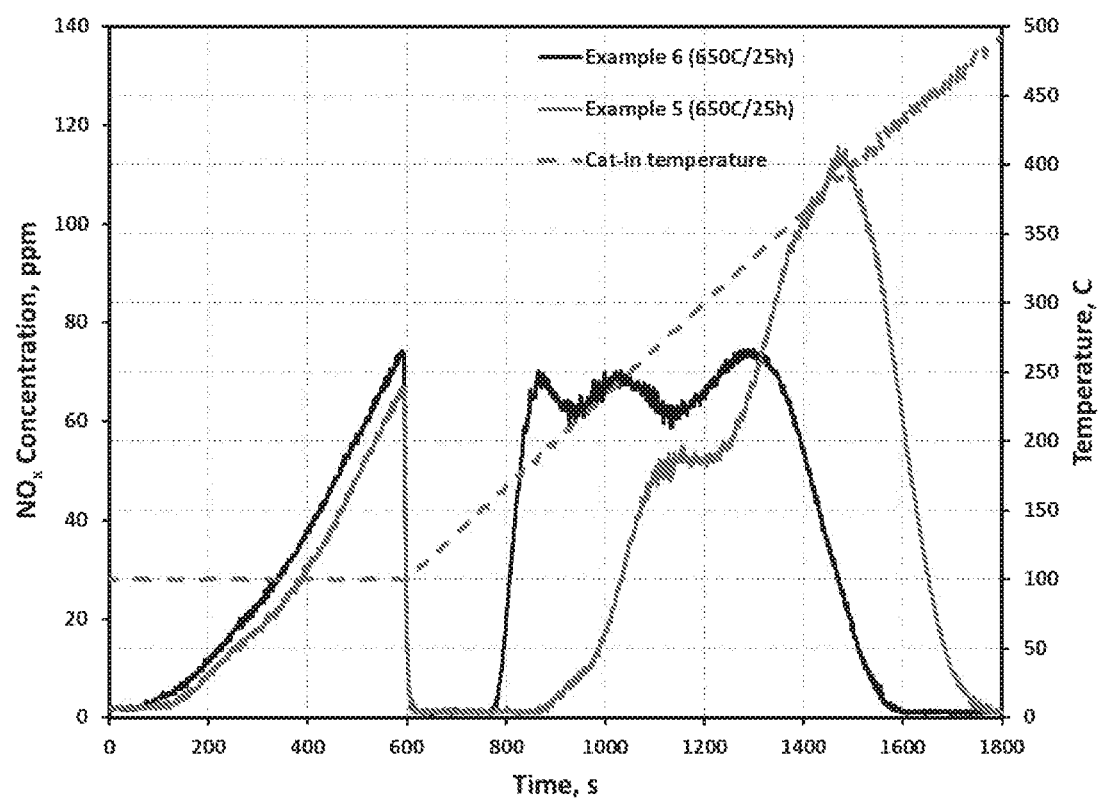
FIG. 8 is a plot of $NO_x$ adsorption/desorption versus time and temperature for embodiments of the present disclosure.

Performance of Example 5 (reference) and Example 6 (inventive) was compared after hydrothermal aging at 750° C. for 25 hours. Although a similar NO$_x$ adsorption profile was observed for both Examples, the lack of Pt associated with either the Pd/zeolite washcoat or in the DOC layer (Example 5) resulted in NO$_x$ desorption shifting to a significantly higher temperature (FIG. 8). In comparison, data for Example 6 demonstrated the surprising beneficial effect of addition of colloidal Pt to the LT-NA bottom coat, reversing the unfavorable temperature shift of NO$_x$ desorption observed for Example 5. Without wishing to be bound by theory, it is believed that the presence of Pt may play a role in enhancing NO$_x$ desorption by regulating oxidation of CO/HC/NO.

Example 14. (Results Comparing Example 6 with Examples 5 and 7)

Figure 9:
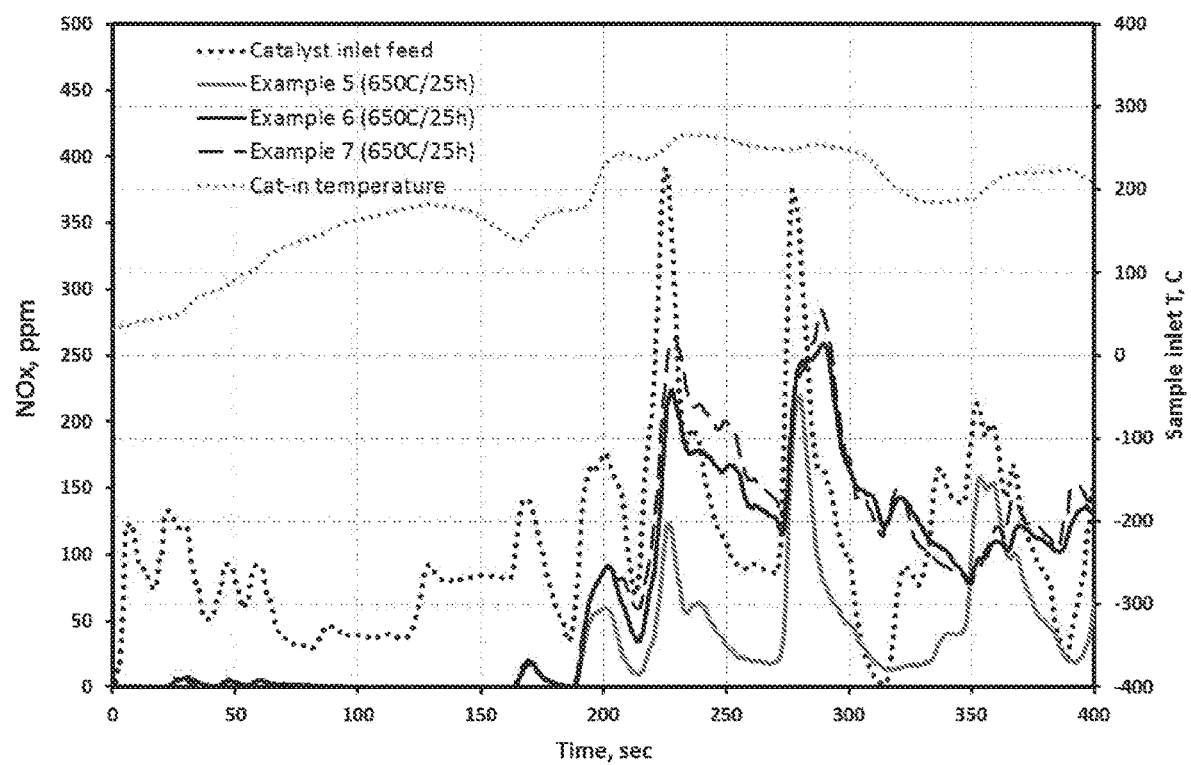
FIG. 9 is a plot of $NO_x$ adsorption/desorption versus time and temperature for embodiments of the present disclosure.

Performance of Examples 5 and 7 (reference examples without and with Pt in DOC layer, respectively) and Example 6 (inventive), after hydrothermal aging at 750° C. for 25 hours, was compared during 0-400 seconds of the first FTP cycle with respect to NO$_x$ adsorption. All three Examples showed nearly complete NO$_x$ adsorption until 160 seconds (FIG. 9). Example 5 continued to adsorb NO$_x$ to ~300 seconds at a relatively high temperature (200-250° C.), whereas Example 6, with colloidal Pt added to the Pd/zeolite bottom coat, starts to desorb NO$_x$ at ~240° C. Example 7, which contained both Pt and Pd in the DOC layer, showed a similar desorption profile to Example 6.

Figure 10:
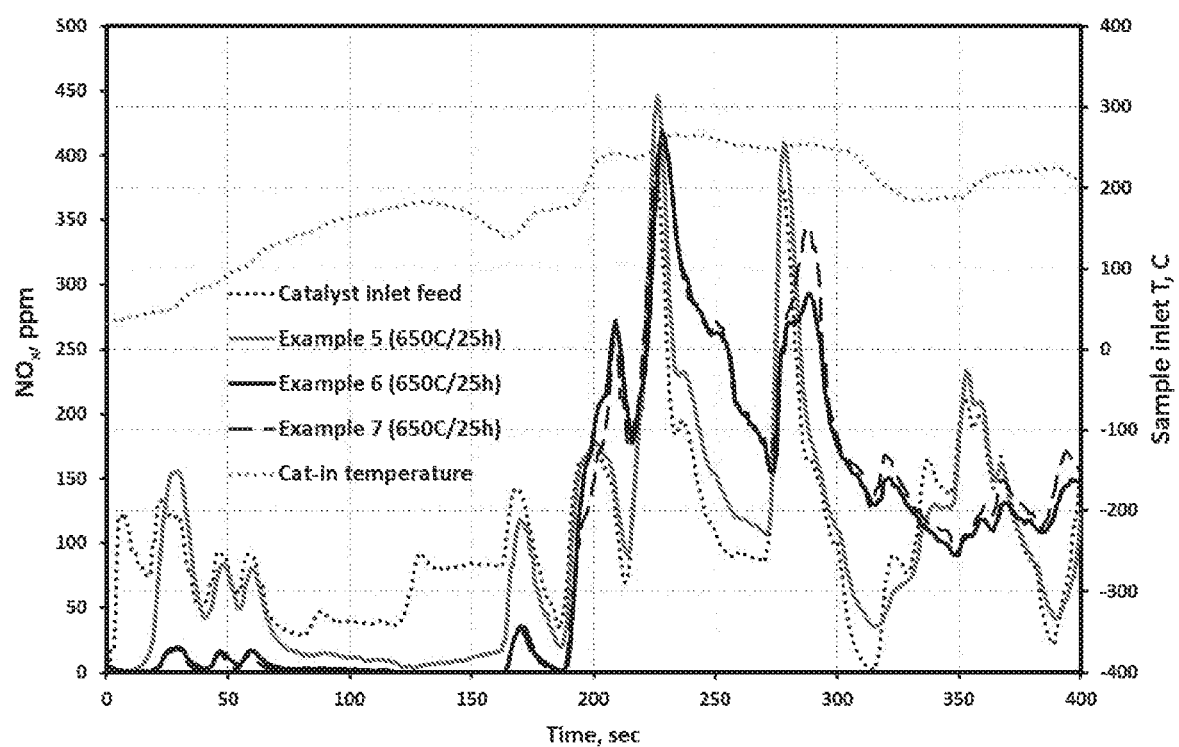
FIG. 10 is a plot of $NO_x$ adsorption/desorption versus time and temperature for embodiments of the present disclosure.

During 0-400 seconds of the second FTP cycle, Example 5 showed significantly decreased cold-start NO$_x$ adsorption due to incomplete NO$_x$ desorption in the first FTP cycle (FIG. 10). Example 6 showed good NO$_x$ adsorption at 0-180 seconds, demonstrating enhanced NO$_x$ desorption due to the colloidal Pt addition to the Pd/zeolite layer LT-NA. The same effect was observed with Example 7, which contained both Pt and Pd in the DOC top coat. In certain instances, manufacturers may desire a Pd-only DOC layer. Results in this experiment indicate that an embodiment according to Example 6 can enhance the performance of LT-NA function in such an instance.

Figure 11:
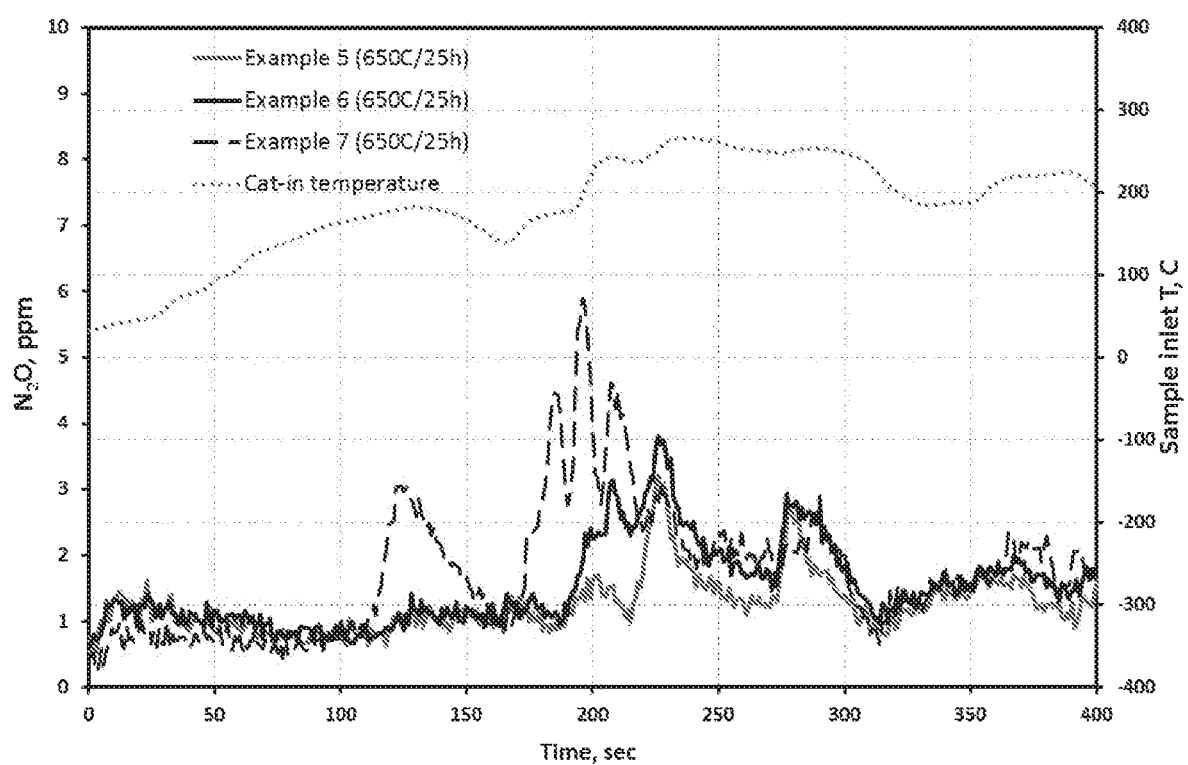
FIG. 11 is a plot of $N_2O$ make versus time and temperature for embodiments of the present disclosure.

Performance of Examples 5, 6, and 7, after hydrothermal aging at 750° C. for 25 hours, was compared during 0-400 seconds of the first FTP cycle with respect to N$_2$O generation (FIG. 11). N$_2$O is an undesirable byproduct of DOC-catalyzed oxidation, and typically increases with increased Pt loading in the DOC. Example 5, which contained a Pd-only DOC, did not generate any $N_2O$ until after 200 seconds into the cold-start. In contrast, Example 7, which contained a Pt/Pd ratio of 2/1 DOC layer, generated more $N_2O$ starting at a relatively lower temperature. Conversely and surprisingly, Example 6 did not lead to a significantly higher amount of $N_2O$, striking a favorable balance between efficient $NO_x$ desorption and minimal $N_2O$ production.

Example 15. (Results Comparing Examples 8 and 9)

Figure 12:
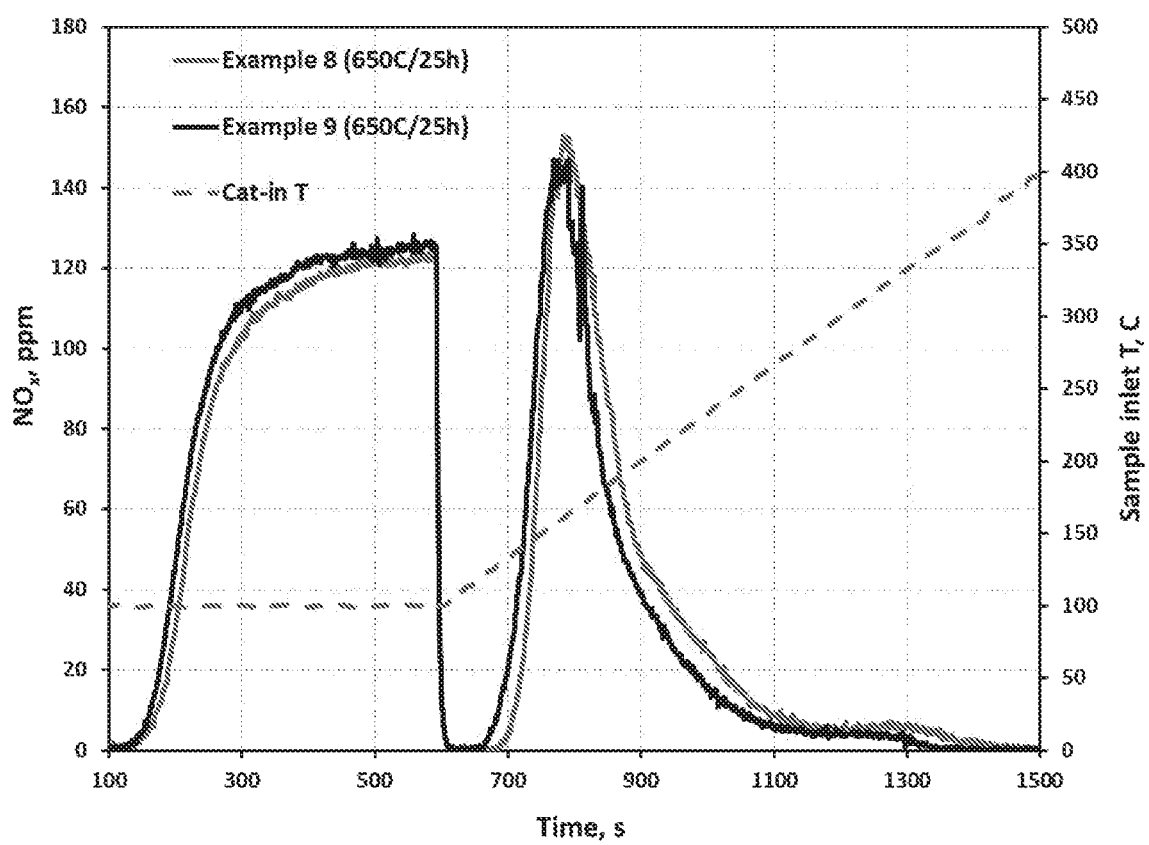
FIG. 12 is a plot of $NO_x$ adsorption/desorption versus time and temperature for embodiments of the present disclosure.

Performance of Example 8 (reference example with Pd/BEA-FER LT-NA) and Example 9 (inventive example with Pd/BEA-FER/colloidal Pt LT-NA), after hydrothermal aging at 650° C. for 25 hours, was compared (FIG. 12). Both onset temperature and peak temperature of $NO_x$ release were shifted by ~10° C. for Example 9 relative to Example 8.

Further, compared to results for Example 2 (FIG. 5), the effect of colloidal Pt addition to the mixed Pd/BEA-FER zeolite LT-NA composition of Example 9 was smaller. Without wishing to be bound by theory, it is believed the Pd/BEA LT-NA composition released $NO_x$ more readily at a lower temperature relative to Pd/FER.

What is claimed is:

1. A Low Temperature $NO_x$ Adsorber (LT-NA) catalyst composition comprising:
    a first zeolite;
    a first palladium component; and
    a plurality of platinum nanoparticles;
    wherein at least a portion of the first palladium component is ion-exchanged in the first zeolite,
    and at least a portion of the platinum nanoparticles are dispersed on the first zeolite.

2. The LT-NA catalyst composition of claim 1, wherein the platinum nanoparticles have an average particle size of from about 1 nm to about 50 nm.

3. The LT-NA catalyst composition of claim 1, wherein the first palladium component is present in an amount of about 0.01% to about 10% by weight, based on the weight of the first zeolite, and calculated as elemental palladium.

4. The LT-NA catalyst composition of claim 1, further comprising a first refractory metal oxide component, wherein at least a portion of the platinum nanoparticles are dispersed on the first refractory metal oxide component.

5. The LT-NA catalyst composition of claim 4, wherein:
    a portion of the platinum nanoparticles is dispersed on the first zeolite; and
    a portion of the platinum nanoparticles is dispersed on the first refractory metal oxide component.

6. The LT-NA catalyst composition of claim 4, wherein the first refractory metal oxide component comprises gamma alumina or alumina doped with from about 2% to about 10% $SiO_2$.

7. The LT-NA catalyst composition of claim 1, wherein the ratio of the first zeolite to the first refractory metal oxide component by weight is from about 10 to about 0.1.

8. The LT-NA catalyst composition of claim 1, wherein the platinum nanoparticles are present in an amount of from about 0.1 to about 10% by weight, based on the weight of the first zeolite, and calculated as elemental platinum.

9. The LT-NA catalyst composition of claim 1, wherein the first zeolite is an aluminosilicate zeolite having a silica-to-alumina ratio (SAR) of from about 5 to about 100.

10. The LT-NA catalyst composition of claim 1, wherein the first zeolite has a framework type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof.

11. The LT-NA catalyst composition of claim 1, further comprising a second zeolite, wherein the second zeolite is a large pore zeolite having a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFW, SOF, SOS, STO, SSF, SSY, USI, UWY, VET and mixtures or intergrowths thereof; and wherein a portion of the first palladium component is ion-exchanged in the second zeolite.

12. The LT-NA catalyst composition of claim 11, wherein a portion of the platinum nanoparticles are dispersed on the second zeolite.

13. The LT-NA catalyst composition of claim 1, wherein the LT-NA composition adsorbs $NO_x$ components from an exhaust gas stream at a temperature of from about 20° C. to about 200° C., and in an amount of from at least 30 to about 100% of the theoretical amount, based on a 1:1 mole ratio of $NO_x$/Pd, and based on the total amount of $NO_x$ present in the exhaust gas stream.

14. The LT-NA catalyst composition of claim 1, wherein the LT-NA catalyst composition releases $NO_x$ components back into an exhaust gas stream at a temperature of from about 150° C. to about 300° C., and in an amount of from at least 35 to about 100% by weight, based on the total amount of $NO_x$ components adsorbed onto the LT-NA catalyst composition.

15. The LT-NA catalyst composition of claim 1, wherein the LT-NA catalyst composition, after hydrothermal aging at 750° C.-800° C. for a period of from about 16 to about 80 hours, has a $NO_x$ adsorption capacity that is from about 0.8 to about two times the $NO_x$ adsorption capacity prior to hydrothermal aging.

16. A LT-NA catalyst article for treating an exhaust stream of an internal combustion engine, the article comprising a substrate having an inlet end and an outlet end defining an overall length, and a first washcoat comprising the LT-NA catalyst composition of claim 1 disposed on at least a portion thereof.

17. The LT-NA catalyst article of claim 16, wherein the substrate comprises a honeycomb substrate in the form of a wall flow filter or a flow through substrate.

18. The LT-NA catalyst article of claim 17, wherein the DOC composition further comprises a third zeolite.

19. The LT-NA catalyst article of claim 18, wherein the third zeolite comprises Beta zeolite (BEA) which is substantially free of any platinum-group metal (PGM) species.

20. The LT-NA catalyst article of claim 16, further comprising a second washcoat comprising a diesel oxidation catalyst (DOC) composition disposed on at least a portion of the substrate.

21. The LT-NA catalyst article of claim 16, wherein the DOC composition comprises a second Pd component and a second refractory metal oxide component, wherein the second Pd component is supported on the second refractory metal oxide component.

22. The LT-NA catalyst article of claim 21, wherein the second refractory metal oxide comprises gamma alumina or alumina doped with about 2% to about 10% $SiO_2$.

23. The LT-NA catalyst article of claim 16, wherein the first and second washcoats are present in a layered configuration, wherein the first washcoat is disposed directly on the substrate, and the second washcoat is disposed on at least a portion of the first washcoat.

24. The LT-NA catalyst article of claim 16, wherein the first and second washcoats are present in a layered configuration, wherein the second washcoat is disposed directly on the substrate and the first washcoat is disposed on at least a portion of the second washcoat.

25. The LT-NA catalyst article of claim 16, wherein the first washcoat and the second washcoat are combined and disposed on the substrate in a single homogenous layer.

26. The LT-NA catalyst article of claim 16, wherein the first and second washcoats are present in a zoned configuration, wherein the first washcoat is disposed on the catalyst substrate from the inlet end to a length from about 10% to about 70% of the overall length; and wherein the second washcoat is disposed on the catalyst substrate from the outlet end to a length from about 30 to about 90% of the overall length.

27. An exhaust gas treatment system comprising the LT-NA catalytic article of claim 16, wherein the LT-NA catalytic article is downstream of and in fluid communication with an internal combustion engine.

28. The exhaust gas treatment system of claim 27, further comprising one or more of a lean $NO_x$ trap (LNT), a selective catalytic reduction (SCR) catalyst, an ammonia or ammonia precursor injection component, a catalyzed soot filter (CSF), or an ammonia oxidation (AMOx) catalyst.

29. A method for reducing a $NO_x$ level in an exhaust gas stream from an internal combustion engine, the method comprising contacting the exhaust gas stream with the LT-NA catalyst article of claim 1.

30. A Low Temperature $NO_x$ Adsorber (LT-NA) catalyst composition comprising:
a first zeolite;
a first palladium component;
a plurality of platinum nanoparticles; and
a first refractory metal oxide component
wherein at least a portion of the first palladium component is ion-exchanged in the first zeolite, and
a ratio of the first zeolite to the first refractory metal oxide component by weight is from about 10 to about 0.1.

31. A Low Temperature $NO_x$ Adsorber (LT-NA) catalyst composition comprising:
a first zeolite;
a first palladium component;
a plurality of platinum nanoparticles; and
a second zeolite,
wherein at least a portion of the first palladium component is ion-exchanged in the first zeolite,
the second zeolite is a large pore zeolite having a framework type selected from the group consisting of AFT, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFW, SOF, SOS, STO, SSF, SSY, USI, UWY, VET and mixtures or intergrowths thereof; and
a portion of the first palladium component is ion-exchanged in the second zeolite.

* * * * *